United States Patent
Suzuki et al.

(10) Patent No.: US 6,313,941 B1
(45) Date of Patent: Nov. 6, 2001

(54) OPTICAL COMPONENT, OPTICAL AMPLIFIER AND METHOD OF CONTROLLING OPTICAL AMPLIFIER CHARACTERISTIC

(75) Inventors: Mikiya Suzuki; Shigeru Shikii, both of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/518,175

(22) Filed: Mar. 2, 2000

(30) Foreign Application Priority Data

Mar. 23, 1999 (JP) .................................................. 11-077604

(51) Int. Cl.[7] ...................................................... H01S 3/00
(52) U.S. Cl. .............................. 359/337; 359/161; 372/34
(58) Field of Search ................................... 359/337, 161; 372/34

(56) References Cited

U.S. PATENT DOCUMENTS 5,337,176 * 8/1994 Tiemeijer .............................. 359/344
5,673,129 * 9/1997 Mizrahi ................................ 359/124
6,049,414 * 4/2000 Espindola et al. .................... 359/337
6,104,526 * 8/2000 Kakui .................................... 359/337

* cited by examiner

Primary Examiner—Mark Hellner
(74) Attorney, Agent, or Firm—Wenderoth, Lind & Ponack, L.L.P.

(57) ABSTRACT

An optical amplifier that can easily cope with alteration of characteristics and whereby a prescribed characteristic can be obtained in a stable fashion. In an optical amplifier, a plurality of optical components including optical amplification media that amplify input signal light are cascade-connected. There are provided (1) a temperature adjustment member capable of changing the temperature of one or a plurality of optical components in accordance with a temperature control signal that is input, and (2) a characteristic control device that supplies in respect of the temperature adjustment member a control signal that controls a prescribed optical characteristic having temperature dependence in one or a plurality of optical components that are the subject of adjustment by the temperature adjustment member, being a prescribed optical characteristic that is demanded for the optical amplifier.

33 Claims, 13 Drawing Sheets

OPTICAL COMPONENT, OPTICAL AMPLIFIER AND METHOD OF CONTROLLING OPTICAL AMPLIFIER CHARACTERISTIC

BACKGROUND OF THE INVENTION

1. Field of the Invention

The present invention relates to an optical component, optical amplifier and method of controlling an optical amplifier characteristic and may be applied for example to an erbium-doped fiber amplifier (EDFA) and to an optical component used to construct the EDFA.

2. Description of Related Art

An EDFA is an optical device comprising a plurality of optical components. FIG. 1 is a block diagram showing the layout of a conventional EDFA in which the forward pumping method is adopted.

In FIG. 1, pumping light from a pumping source (for example LD) 6 is sent through a WDM (Wavelength Division Multiplexing) coupler 2 to an erbium-doped optical fiber (EDF) 3 and is absorbed thereby, creating a highly inverted distribution therein. When input light (input signal light) is directed on to EDF 3 through isolator 1 and WDM coupler 2 in a condition with pumping light directed on to EDF 3, this signal light is progressively amplified by the stimulated discharge effect, and this amplified signal light is emitted as output signal light output light (output signal light) from isolator 4. The optical amplification characteristic of the output light that is output from isolator 4 shows wavelength dependence and in order to compensate for this wavelength dependence the optical signal is output through a filter 5 consisting of for example a fiber grating (FBG).

The specification of the various optical components that are employed in an EDFA depends on whether the input optical signal that is input by the EDFA is a single-wavelength optical signal (S signal) or a Wavelength Division Multiplex signal (WDM signal).

Also, pumping source 6 is typically constituted by a semiconductor laser (LD). When the power or wavelength of the pumping light from this pumping source (LD) 6 changes, the amplification characteristic in the EDF changes. Conventionally, in order to keep the pumping wavelength and pumping optical power constant, the pumping source 6 is provided with a temperature compensation construction so as to maintain constant temperature of the source 6. However, temperature compensation is not effected in respect of the other optical components.

Further, if the desired quality characteristics of the EDFA were not obtained for example on inspection on shipping, due to product variability of the various optical components, in order to obtain the desired quality characteristics of the EDFA, the following methods were adopted. The various types of characteristics include for example the optical amplification characteristic, wavelength-dependent output power difference, noise factor, and filter characteristic etc.

(1) Alteration of the amplification factor could be achieved by replacing some or all of the isolator 1, WDM coupler 2, EDF 3, isolator 4 or filter 5 components. For example, if the isolator 1, WDM coupler 2, isolator 4 and filter 5 were made replaceable, they could be replaced by components of different optical power loss, and if EDF 3 were made replaceable, it could be replaced by a component of different amplification factor.

(2) If it is desired to alter the wavelength-dependent output power difference when the WDM signal is amplified, this can be done by changing EDF 3, which constitutes the amplification medium, or by changing filter 5 to one of a different optical band pass characteristic.

(3) Improvement of the noise factor (NF) can be achieved by replacing EDF 3 by one of shorter length. Or this could be achieved by replacing pumping source (LD) 6 by one of larger pumping power, replacing isolator 1 by one of low power loss, or replacing WDM coupler 2 by one of low power loss.

As described above, to alter the quality characteristic of a conventional EDFA, the most direct and effective method was to replace optical components. However, this gave rise to the following inconveniences, after the EDFA was assembled as an optical amplifier.

(1) Alteration of the amplification factor is not easy since it involves replacement of optical components wherein optical fibers are fixed usually by means of adhesive. This is also inconvenient since, in order to achieve high output, it is necessary to change to an LD (pumping source) of large pumping power and/or to change the EDF itself.

(2) Alteration of the output characteristic at different wavelengths (i.e. wavelength-dependent output power difference) in a WDM signal is inconvenient since it is necessary either to alter the filter (for example FGB) for this characteristic, or to change the EDF itself.

(3) Improvement of the NF is inconvenient, since this must be effected by changing to an EDF 3 of shorter dimensions or by replacing pumping source (LD) 6 by one of larger pumping power, replacing isolator 1 by one of low power loss, or replacing WDM coupler 2 by one of low power loss.

(4) Temperature control is not performed in respect of optical components other than pumping source (LD) 6. The characteristics of these optical components have characteristic temperature dependencies. It is therefore a problem that, when the ambient temperature changes, the quality characteristic of the optical components departs from the normal-temperature characteristic on which the design was based and that this may therefore cause the quality characteristic of the EDFA as a whole to depart from the set characteristic.

SUMMARY OF THE INVENTION

An object of the present invention is therefore to provide an optical amplifier or method of controlling the characteristic of an optical amplifier whereby alterations of characteristic can easily be coped with and a prescribed quality characteristic can be obtained in stable fashion.

A further object of the present invention is to provide optical components that are ideal for use in such an optical amplifier.

In order to achieve these objects, an optical component according to the present invention comprises: an optical component body that outputs emitted light obtained by performing prescribed optical processing on input light and wherein the quality of an optical characteristic of prescribed type depends on temperature; a temperature adjustment member for adjusting the temperature of said optical component body to an adjustment temperature; and a characteristic control circuit that outputs in respect of this temperature adjustment member a temperature control signal to make it have the adjustment temperature.

In implementing this optical component, preferably, the characteristic control circuit comprises: an optical characteristic monitoring section at a prescribed position on the optical path on which the optical component body lies and that detects information that expresses the quality of the optical characteristic of prescribed type of this optical component body and generates a detection output; and a characteristic control section that forms the temperature control signal by utilizing this detected output.

In an optical amplifier according to the present invention that outputs as an output optical signal an optically amplified signal obtained by optical amplification of an input light signal; there are provided an optical system comprising a plurality of optical components including an optical amplification medium; at least one of the optical components being an optical component body wherein the quality of an optical characteristic of prescribed type depends on temperature; comprising a temperature adjustment member for adjusting the temperature of the optical component body to an adjustment temperature; and comprising a characteristic control circuit that outputs in respect of this temperature adjustment member a temperature control signal to make it have the adjustment temperature.

In implementing this optical amplifier, preferably, the characteristic control circuit comprises: an optical characteristic monitoring section that detects, at a prescribed position on the optical path, information that expresses the quality of the optical characteristic of prescribed type of this optical component body and generates a detected output; and a characteristic control section that forms the temperature control signal by utilizing this detected output.

Furthermore, in a method of controlling the quality of the optical characteristic of an optical amplifier according to the present invention comprising an optical system comprising an optical component: when this optical component performs optical processing on an optical signal and has an optical characteristic of prescribed type that acts in this optical processing, the quality of the optical characteristic having temperature dependence; information that represents the quality of the optical characteristic of this optical component at the current time-point is acquired; a temperature control signal based on this acquired information is generated; the temperature of the temperature adjustment member is adjusted to a holding temperature responsive to this temperature control signal; and the optical characteristic is adjusted to an optical characteristic of quality corresponding to this adjustment temperature by directly or indirectly setting the temperature of the optical component body to an adjustment temperature by a holding temperature of the temperature adjustment member.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

(A) First Embodiment

A first embodiment in which optical components, an optical amplifier and method of controlling the characteristic of an optical amplifier according to the present invention are applied to an EDFA (erbium-doped fiber amplifier) will be described in detail below. The EDFA of this first embodiment uses the forward pumping system employing a single-wavelength signal (S signal).

Figure 1:
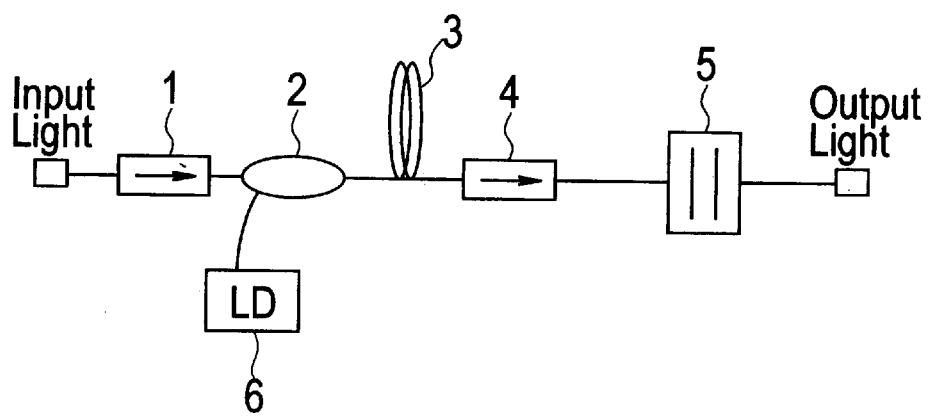
FIG. 1 is a block diagram showing the structure of a prior art EDFA.
Figure 2:
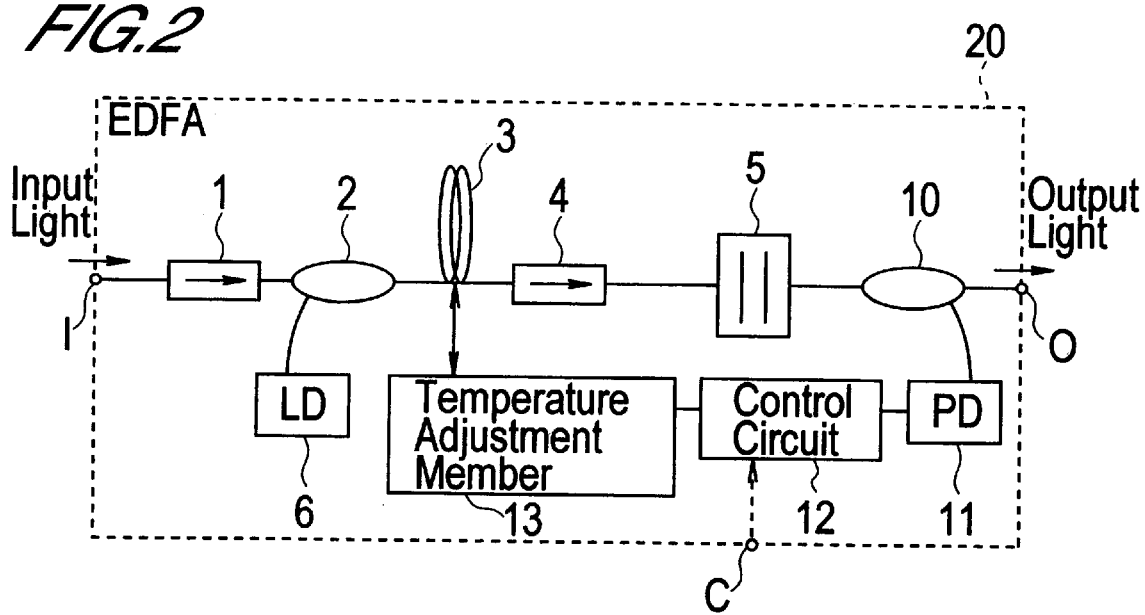
FIG. 2 is a block diagram showing the structure of EDFAs according to first and eighth embodiments of the present invention.

FIG. 2 is a block diagram showing the layout of an EDFA according to the first embodiment; constitutional elements that are identical with or correspond to FIG. 1 described above will be given the same reference numerals.

In FIG. 2, the EDFA 20 of the first embodiment comprises an isolator 1, WDM coupler 2, EDF 3, isolator 4, filter 5 and pumping source 6 constituting the basic structural elements, and is provided with an optical coupler 10 for dividing the output light, a photodetector element (for example PD) 11, a control circuit 12 and a temperature adjustment member 13. I is an input port (terminal), O is an output port (terminal), and C is a reference information input port. In the case of this first embodiment, the isolator 1, WDM coupler 2, EDF 3, isolator 4, filter 5, output light dividing optical coupler 10 and photodetector element (for example PD) 11 are respectively optical components for an S signal. Of these, the optical components other than pumping source 6, control circuit 12 and temperature adjustment member 13 are components for performing optical processing and form the optical system of the optical amplifier.

Output light dividing coupler 10 is provided downstream of filter 5 and divides the output light from filter 5 into two output beams, one of these divided output beams constituting the output light of the EDFA which is delivered to the next stage, while the other divided beam is supplied to photodetector element 11. This other divided output beam constitutes information expressing the value of the optical characteristic of the optical component.

Photodetector element 11 converts the power of the input divided output light (S signal) to an electrical signal, which it supplies as a power monitoring signal of the output light to control circuit 12. In the case of this first embodiment, the output light is an S signal, and the photodetector element 11 monitors the power of this divided output light component.

Control circuit 12 forms a temperature control signal based on output optical power monitoring signal and reference information that is set or indicated from outside (for example reference output optical power information) and supplies this to temperature adjustment member 13. The method whereby the temperature control signal is formed will be described in detail later.

Temperature adjustment member 13 regulates the temperature of EDF 3 in accordance with the temperature control signal from the control circuit 12. For this temperature adjustment member 13, a plate-shaped member may be employed such as for example a Peltier element or heat pipe that is capable of altering the temperature in response to an electrical signal; in the case of this first embodiment, EDF 3 is mounted on the temperature adjustment member 13. However, this temperature adjustment member 13 could have another shape.

It is preferable that at least the EDF 3 and temperature adjustment member 13 should be heat-insulated from the other structural elements by means of a heat-insulating material or the like. In other words, it is desirable to ensure that the effect of the temperature of the EDF 3 and temperature adjustment member 13 does not affect the other structural elements.

Next, an example of a method of forming a temperature control signal in the control circuit 12 will be described with reference to the drawings. In this embodiment, the main optical component is assumed to be an EDF in which the values of an optical characteristic of prescribed type depend on the temperature.

(1) First Method of Forming a Temperature Control Signal

Figure 3:
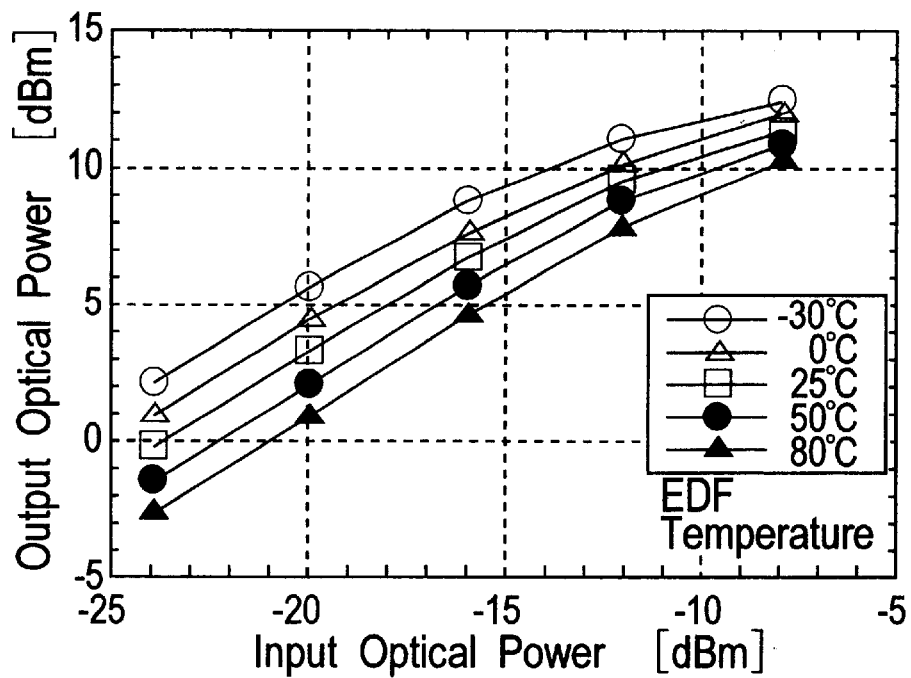
FIG. 3 is a characteristic diagram illustrating the temperature dependence of output optical power with respect to input optical power of an EDF for the case of an S signal, given in explanation of the present invention.

FIG. 3 shows the relationship between the EDF input optical power and output optical power, taking the temperature of EDF 3 as a parameter. In FIG. 3, the input optical power is shown in units of [dBm] along the horizontal axis, while the output optical power is shown in units of [dBm] along the vertical axis. Also, the temperature conditions of EDF 3 are taken as −30° C., 0° C., 25° C., 50° C. and 80° C. From FIG. 3, it can be seen that the output optical power with respect to a given input optical power varies somewhat in accordance with the temperature of the EDF 3. The EDFA of the first embodiment attempts to control the amplification characteristic i.e. quality of the amplification characteristic (in this case, the amplification factor) by utilizing this temperature dependence.

As an example of a method of controlling the amplification characteristic, an example of a method of control will be described in which the output optical power is kept constant, irrespective of the ambient temperature. This example control method is an example in which the input optical power is kept practically constant.

First of all, for example at the time when communication is commenced, the output optical power at this time is detected, with the temperature of EDF 3 adjusted to the temperature that was envisaged on design (hereinbelow this will be termed the "design temperature"; it may be for example 25° C.)

In cases where it is unclear whether or not accurate setting to the set temperature has been achieved, the output optical power at this time is detected with a temperature control signal of an intermediate prescribed value in the dynamic range being supplied to temperature adjustment member 13. The difference of the value of this output optical power from the value of the reference output optical power is obtained and the temperature of EDF 3 is changed in accordance with this difference value. For example, if the difference value is negative (if the value of the output optical power is smaller than the value of the reference output optical power), as can be seen from FIG. 3, control is effected such as to lower the temperature. On the other hand, if the difference value is positive (if the value of the output optical power is larger than the value of the reference output optical power), as can be seen from FIG. 3, control is effected such as to increase the temperature. Subsequently also, control of the temperature of EDF 3 is performed in accordance with the difference of the value of the output optical power from the value of the reference output optical power. It may be arranged to perform the temperature control only at a prescribed time after commencement, once in every communication.

In this process, it may be arranged to change the temperature of EDF 3 in unit temperature steps in response to whether the difference is positive or negative, or it may be arranged to change the temperature of EDF 3 in a direction determined by whether the difference is positive or negative by a temperature amount depending on the absolute value of the difference. In the former case, it is not necessary to hold information concerning the temperature dependence characteristic as shown in FIG. 3 in control circuit 12, but, in the latter case, it is necessary to hold temperature dependence information as shown in FIG. 3 in control circuit 12 (this may be the characteristic information of an EDF 3 standard product, or may be the individual characteristic information of the EDF 3 that is incorporated in the product).

In the above description, the reference output optical power constituting the target for control was shown as being supplied from the outside through port C, but it would be possible to take the output optical power detected at the design temperature as the reference output optical power and to perform subsequent control operation using this. Also, rather than forming a temperature control signal based on the difference, it would be possible to form a temperature control signal by incorporating in control circuit 12 for example a correspondence table (not being a correspondence table based on the design value of the EDF 3) between temperature control signal and output optical power in respect of the currently employed EDF 3.

(2) Second Method of Forming a Temperature Control Signal

It would also be possible, in contrast to what is described above, to make the optical characteristic of prescribed type the noise factor, and for control circuit 12 to form a temperature control signal such as to improve the quality (in this case the value) thereof.

Figure 4:
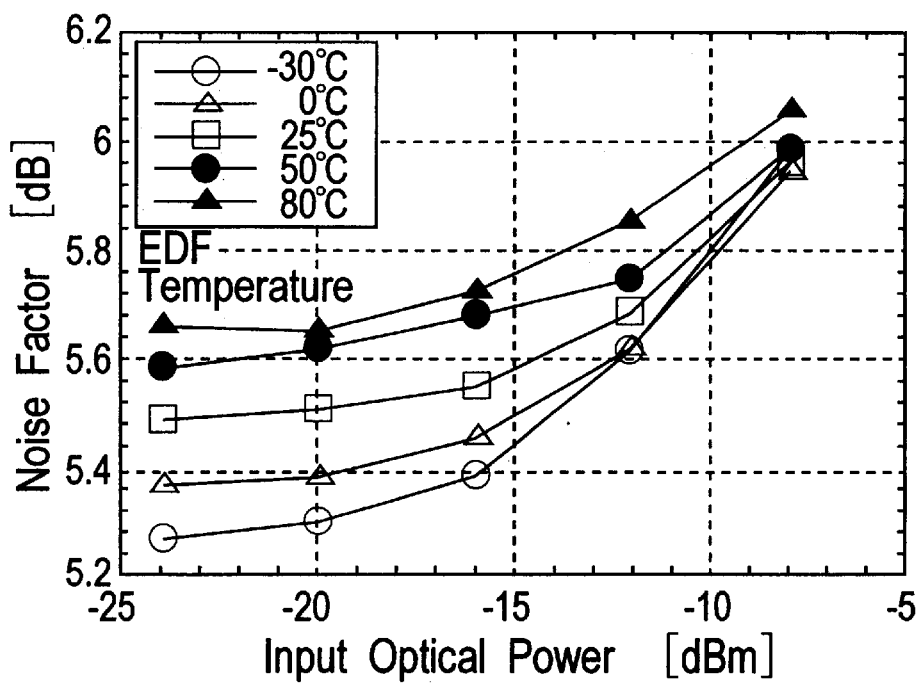
FIG. 4 is a characteristic diagram illustrating the temperature dependence of the noise factor characteristic with respect to the input optical power of an EDF for an S signal, given in explanation of the present invention.

FIG. 4 shows the characteristic of the noise factor (NF) with respect to input optical power of EDF 3 at various temperatures. In FIG. 4, input optical power in units of [dBm] is shown along the horizontal axis and noise factor NF in units of [dB] is shown along the vertical axis. Also, the temperature conditions of the EDF 3 are the same conditions as in the case of FIG. 3. From this FIG. 4, it can be seen that if the input optical power is fixed, the noise factor changes with temperature.

From FIG. 3 described above, it can be seen that there is a fixed relationship between the input optical power and output optical power, although this changes with temperature.

Although a detailed description of this will be omitted, if the relationships of these FIG. 3 and FIG. 4 are combined, a noise factor characteristic in respect of output optical power of EDF 3, or, to be more precise, NF characteristics at various temperatures could of course be obtained.

By utilizing such information concerning the temperature dependence characteristic of the noise factor on output optical power of EDF 3, the noise factor can be kept below a fixed value.

First of all, for example at the time when communication is commenced, the output optical power at this time is detected by means of control circuit 12 with the temperature of EDF 3 adjusted to the design temperature. In cases where it is unclear whether or not accurate setting to the set temperature has been achieved, the output optical power of EDF 3 at this time is detected with a temperature control signal of an intermediate prescribed value in the dynamic range being supplied to temperature adjustment member 13. Thus, the dependence of the noise factor on the output optical power can be grasped, making it possible to ascertain whether the noise factor is smaller than the upper limit which is allowed for the noise factor.

If the noise factor which is obtained is smaller than the allowed upper limit of the noise factor, control circuit 12 maintains the current value of the temperature control signal. On the other hand, if the noise factor which is obtained is above the upper limit value which is allowed for the noise factor, control circuit 12 lowers the temperature of EDF 3 by supplying to temperature adjustment member 13 a temperature control signal that is smaller than the temperature control signal that was previously supplied, such as to lower the temperature by a temperature amount corresponding to the difference from the allowed upper limit value, or a temperature control signal that is smaller by a unit temperature amount from the temperature control signal that was previously supplied. The quality of the noise factor of EDF 3 is improved by thus lowering the temperature.

Subsequently in the same way the operation of improving the noise factor by monitoring the output optical power is executed. It is possible to perform the operation once only during each communication, at a prescribed time after the start.

Although it was assumed that the allowed upper limit value of the noise factor was supplied from outside, it would also be possible to use as the allowed upper limit value of the noise factor in subsequent control operations the value of the noise factor detected at the design temperature, with a prescribed offset added thereto.

It would also be possible to form a temperature control signal by incorporating in control circuit 12 for example a correspondence table of the temperature control signal with the output optical power of EDF 3 which was formed beforehand with the object of improving the noise factor. The correspondence table of the temperature control signal with the output optical power which was formed beforehand with the object of improving the noise factor could be individual to each EDF 3 or could be formed based on the design characteristic of the EDF 3.

It should be noted that the method of forming a temperature control signal based on the output optical power is not restricted to the two types of method described above. A technique utilizing the temperature dependence of the characteristic shown in FIG. 3 or FIG. 4, or, further, the temperature dependence of a characteristic derived from FIG. 3 or FIG. 4, or other method, could be employed. That is, providing that the method is one whereby a prescribed amplification characteristic or an improved characteristic of the noise factor can be achieved by temperature control of the EDF 3, the method of forming of the temperature control signal based on the output optical power is not restricted to the two methods described above.

With an EDFA according to the first embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

For example, by storing the information as shown in FIG. 3, i.e., information concerning the characteristics of the EDF 3 that was incorporated in the EDFA and which are detected on shipment, instead of storing information determined from the set value in respect of EDF 3, replacement of individual components (EDFs) can be made unnecessary. Furthermore, if for example, instead of storing information determined from the set value in respect of EDF 3, as the reference information of for example the reference output optical power, the values corresponding to the characteristic information in respect of the EDF 3 incorporated in the EDFA and detected on shipping are employed, replacement of individual components can be made unnecessary.

(2) Since arrangements are made to obtain the desired characteristic by directly adjusting the temperature of EDF 3, the characteristic of EDF 3 is changed by this directly adjusted temperature rather than by the ambient temperature, so, as a result, an EDFA exhibiting the desired characteristics can be implemented irrespective of fluctuations in ambient temperature.

(B) Second Embodiment

The difference of the second embodiment from the first embodiment lies in the fact that information is detected that expresses the value of an optical characteristic of prescribed type of this optical component itself, from a stage of the optical system of the optical amplifier, which is upstream of the optical component itself The method of forming a temperature control signal by utilizing this information is identical with that of the first embodiment.

A second embodiment in which optical components, an optical amplifier and method of controlling the characteristic of an optical amplifier according to the present invention are applied to an EDFA will be described in detail below. The EDFA of this second embodiment uses the forward pumping system employing a single-wavelength signal (S signal).

Figure 5:
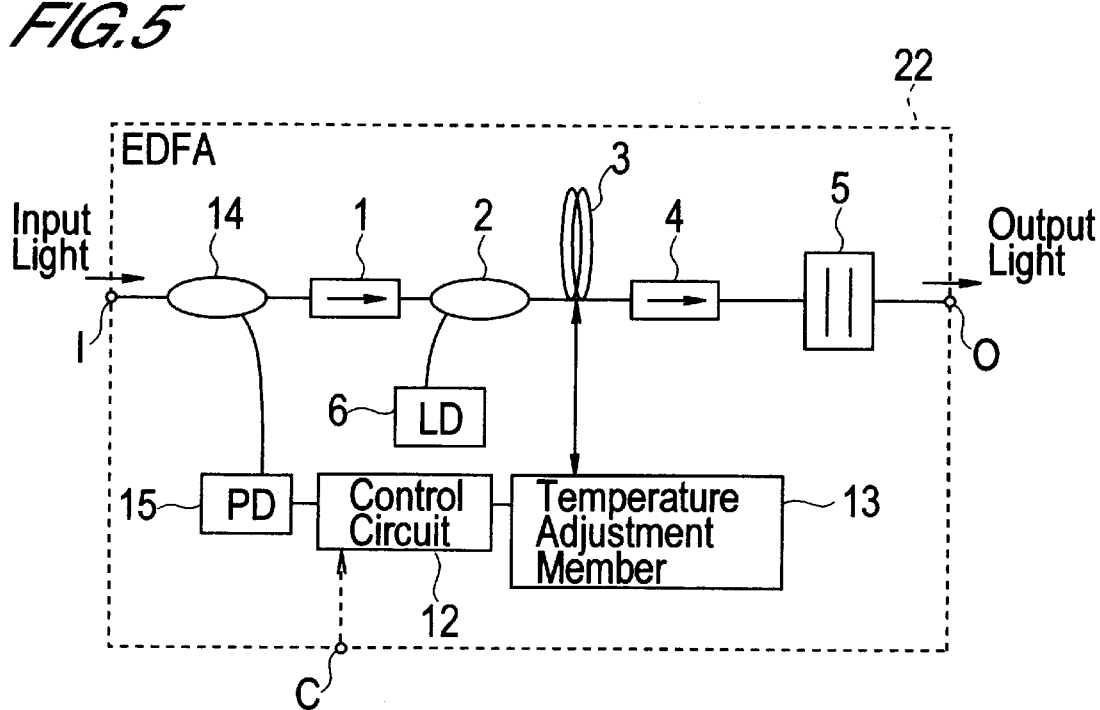
FIG. 5 is a block diagram illustrating the construction of an EDFA according to second and ninth embodiments of the present invention.

FIG. 5 is a block diagram showing the layout of an EDFA 22 according to the second embodiment; constitutional elements that are identical with or correspond to FIG. 1 described above will be given the same reference numerals.

In FIG. 5, the EDFA 22 of the second embodiment comprises optical components such as an isolator 1, WDM coupler 2, EDF 3, isolator 4, filter 5 and pumping source 6 constituting the basic structural elements, and is provided with an optical coupler 14 for dividing the output light, a photodetector element (for example PD) 15, a control circuit 12 and a temperature adjustment member 13. In this embodiment, the EDF 3 constitutes on optical component body.

In the case of this second embodiment, the isolator 1, WDM coupler 2, EDF 3, isolator 4, filter 5, output light dividing optical coupler 14 and photodetector element (for example PD) 15 are respectively optical components for an S signal.

Output light dividing coupler 14 is provided at the input stage of the EDFA 22 and divides the output light from outside thereof into two, one of these divided output beams constituting the output light of the EDFA which is delivered to the isolator 1, while the other divided beam is supplied to photodetector element 15.

Photodetector element 15 converts the power of the input divided output light (S signal) to an electrical signal, which it supplies as a power monitoring signal of the output light to control circuit 12. In the case of this second embodiment, the input light is an S signal, and the photodetector element 15 monitors the power of this divided output light component.

Control circuit 12 forms a temperature control signal based on input optical power monitoring signal and reference information that is set or indicated from outside (for example reference output optical power information) and supplies this to temperature adjustment member 13. The method of this embodiment whereby the temperature control signal is formed will be described in detail later.

Temperature adjustment member 13 is identical with that of the first embodiment and adjusts the temperature of EDF 3 in response to the temperature control signal from control circuit 12.

It is preferable that at least the EDF 3 and temperature adjustment member 13 should be heat-insulated from the other structural elements by means of a heat-insulating material or the like. In other words, it is desirable to ensure that the effect of the temperature of the EDF 3 and temperature adjustment member 13 does not affect the other structural elements.

Next, an example of a method of forming a temperature control signal in the control circuit 12 will be described with reference to the drawings.

(1) First Method of Forming a Temperature Control Signal

From FIG. 3, it can be seen that the output optical power with respect to a given input optical power varies somewhat in accordance with the temperature of the EDF 3. The EDFA of the second embodiment attempts to control the amplification characteristic i.e. quality of the amplification characteristic (in this case, the amplification factor) by utilizing this temperature dependence.

As an example of a method of controlling the amplification characteristic, an example of a method of control will be described in which the output optical power is kept constant, irrespective of the ambient temperature.

Also, a storage unit is provided in control circuit 12, the temperature dependence of output optical power on input optical power being stored beforehand in this storage unit.

In the initial condition such as the communication standby condition, etc., control circuit 12 supplies to temperature adjustment member 13 a temperature control signal such that the temperature of EDF 3 becomes the design temperature.

When communication is commenced, control circuit 12 obtains input optical power in response to the detection signal of photodetector element 15. The output optical power at the design temperature for this input optical power is then found by utilizing the characteristic information shown in FIG. 3 stored in the incorporated storage unit.

The difference of the value of this output optical power from the value of the reference output optical power is obtained and the temperature of EDF 3 is changed in accordance with this difference value. For example, if the difference value is negative (if the value of the output optical power is smaller than the value of the reference output optical power), as can be seen from FIG. 3, control is effected such as to lower the temperature. On the other hand, if the difference value is positive (if the value of the output optical power is larger than the value of the reference output optical power), as can be seen from FIG. 3, control is effected such as to increase the temperature. Subsequently also, control of the temperature of EDF 3 is performed in accordance with the difference of the value of the output optical power from the value of the reference output optical power, the output optical power being obtained from the detected input optical power and selected adjustment temperature.

In this process, it may be arranged to change the temperature of EDF 3 in unit temperature steps in response to whether the difference is positive or negative, or it may be arranged to change the temperature of EDF 3 in a direction determined by whether the difference is positive or negative by a temperature amount depending on the absolute value of the difference.

Although in the above description the case was illustrated where the reference output optical power constituting the control target was supplied from outside through port C, it would be possible to take the reference output optical power as the output optical power in the initial communication period calculated at the design temperature and to perform subsequent control operation using this.

Also, rather than forming a temperature control signal based on the difference, it would be possible to form a temperature control signal by incorporating in control circuit 12 for example a correspondence table between temperature control signal and input optical power in respect of the currently employed EDF 3.

(2) Second Method of Forming a Temperature Control Signal

It would also be possible, in contrast to what is described above, to make the optical characteristic of prescribed type the noise factor, and for control circuit 12 to form a temperature control signal such as to improve the quality thereof.

FIG. 4 shows the characteristic of the noise factor (NF) with respect to input optical power of EDF 3 at various temperatures. By utilizing such information concerning the temperature dependence characteristic of the noise factor on input optical power of EDF 3, the noise factor can be kept below a fixed value. Also, a storage unit is provided in control circuit 12, the NF characteristic information being stored beforehand in this storage unit.

The input optical power at this time is detected by means of control circuit 12 with the temperature of EDF 3 adjusted to the design temperature. In cases where it is unclear whether or not accurate setting to the set temperature has been achieved, the input optical power of EDF 3 at this time is detected with a temperature control signal of an intermediate prescribed value in the dynamic range being supplied to temperature adjustment member 13. Thus, the noise factor corresponding to the input optical power can be grasped from the characteristic information as shown in FIG. 4 stored in the control circuit 12. This makes it possible to ascertain whether the noise factor is smaller than the upper limit that is allowed for the noise factor.

If the noise factor that is obtained is smaller than the allowed upper limit of the noise factor, control circuit 12 maintains the current value of the temperature control signal. On the other hand, if the noise factor that is obtained is above the upper limit value that is allowed for the noise factor, control circuit 12 lowers the temperature of EDF 3 by supplying to temperature adjustment member 13 a temperature control signal that is smaller than the temperature control signal that was previously supplied, such as to lower the temperature by a temperature amount corresponding to the difference from the allowed upper limit value, or a temperature control signal that is smaller by a unit temperature amount from the temperature control signal that was previously supplied. The quality of the noise factor of EDF 3 is improved by thus lowering the temperature. Subsequently in the same way the operation of improving the noise factor by monitoring the input optical power is executed. It is possible to perform the operation once only during each communication, at a prescribed time after the start.

Although it was assumed that the allowed upper limit value of the noise factor was supplied from outside, it would also be possible to use as the allowed upper limit value of the noise factor in subsequent control operations the value of the noise factor detected at the design temperature, with a prescribed offset added thereto.

It would also be possible to form a temperature control signal by incorporating in control circuit 12 for example a correspondence table of the temperature control signal with the input optical power of EDF 3 which was formed beforehand with the object of improving the noise factor. The correspondence table of the temperature control signal with the input optical power which was formed beforehand with the object of improving the noise factor could be individual to each EDF 3 or could be formed based on the design characteristic of the EDF 3.

It should be noted that the method of forming a temperature control signal based on the input optical power is not restricted to the two types of method described above. A technique utilizing the temperature dependence of the characteristic shown in FIG. 3 or FIG. 4, or, further, the temperature dependence of a characteristic derived from FIG. 3 or FIG. 4, or other method, could be employed. That is, providing that the method is one whereby a prescribed amplification characteristic or an improved characteristic of the noise factor can be achieved by temperature control of the EDF 3, the method of forming of the temperature control signal based on the input optical power is not restricted to the two methods described above.

With an EDFA according to the second embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

(2) Since arrangements are made to obtain the desired characteristic by directly adjusting the temperature of EDF 3, the characteristic of EDF 3 is changed by this directly adjusted temperature rather than by the ambient temperature. As a result, an EDFA exhibiting the desired characteristics can be implemented irrespective of fluctuations in ambient temperature.

(C) Third Embodiment

This embodiment is a similar embodiment combining the first and second embodiments.

A third embodiment in which optical components, an optical amplifier and method of controlling the characteristic of an optical amplifier according to the present invention are applied to an EDFA will be described in detail below. The EDFA of this third embodiment uses the forward pumping system employing a single-wavelength signal (S signal).

Figure 6:
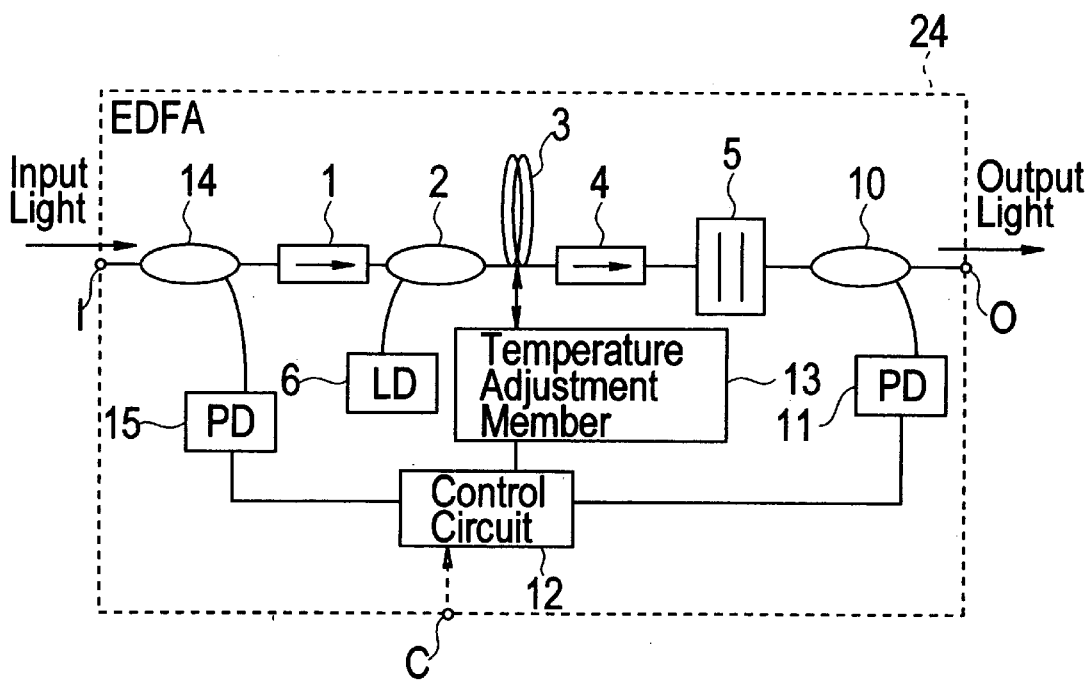
FIG. 6 is a block diagram illustrating the construction of an EDFA according to third and tenth embodiments of the present invention.

FIG. 6 is a block diagram showing the layout of an EDFA according to the third embodiment; constitutional elements that are identical with or correspond to Figures described above will be given the same reference numerals.

In FIG. 6, the EDFA 20 of the third embodiment comprises an isolator 1, WDM coupler 2, EDF 3, isolator 4, filter 5 and pumping source 6 constituting the basic structural elements, and is provided with an optical coupler 10 for dividing the output light, a photodetector element (for example PD) 11, an optical coupler 14 for dividing the input light, a photodetector element (for example, PD) 15, a control circuit 12 and a temperature adjustment member 13. In the case of this third embodiment, the isolator 1, WDM coupler 2, EDF 3, isolator 4, filter 5, output light dividing optical coupler 10, photodetector element 11, input light optical coupler 14 and photodetector element 15 are respectively optical components for an S signal.

Coupler 10 for output light division and photodetector element 11 are provided for purposes of monitoring the output optical power in the same way as the EDFA of the first embodiment (see FIG. 1); the output signal of photodetector element 11 is supplied to control circuit 12. Also, optical coupler 14 for input light division and photodetector element 15 are provided for purposes of monitoring input optical power in the same way as the EDFA of the second embodiment (see FIG. 5); the output signal of photodetector element 15 is applied to control circuit 12.

Control circuit 12 of the third embodiment forms a temperature control signal based on input optical power monitoring signal, output optical power monitoring signal and reference information that is set or indicated from outside through the port C and supplies this to temperature adjustment member 13.

It is preferable that at least the EDF 3 and temperature adjustment member 13 should be heat-insulated from the other structural elements by means of a heat-insulating material or the like. In other words, it is desirable to ensure that the effect of the temperature of the EDF 3 and temperature adjustment member 13 does not affect the other structural elements.

Next, an example of a method of forming a temperature control signal in the control circuit 12 of the third embodiment will be described with reference to FIG. 6.

(1) First Method of Forming a Temperature Control Signal

From FIG. 3, it can be seen that the output optical power with respect to a given input optical power varies somewhat in accordance with the temperature of the EDF 3. The EDFA of the third embodiment attempts to control the amplification characteristic i.e. quality of the amplification characteristic by utilizing this temperature dependence.

As an example of a method of controlling the amplification characteristic, an example of a method of control will be described in which the output optical power is kept constant. This example control method is an example in which the input optical power is kept practically constant.

In the initial condition such as the communication standby condition etc., control circuit 12 supplies to temperature adjustment member 13 a temperature control signal such that the temperature of EDF 3 becomes the design temperature.

When communication is commenced, control circuit 12 obtains output optical power. Control circuit 12, then, obtains the difference of the value of this output optical power from the value of the reference output optical power and changes the temperature of EDF 3 in accordance with this difference value. For example, if the difference value is negative (if the value of the output optical power is smaller than the value of the reference output optical power), as can be seen from FIG. 3, control is effected such as to lower the temperature. On the other hand, if the difference value is positive (if the value of the output optical power is larger than the value of the reference output optical power), as can be seen from FIG. 3, control is effected such as to increase the temperature.

As described above, first of all, control is performed so as to make the output optical power constant. Once constant-level control has been established by monitoring the output optical power, subsequently, control circuit 12 monitors fluctuations in the input optical power by using the output signal from photodetector element 15. When the input optical power fluctuates, the temperature of the EDF 3 is adjusted by forming a temperature control signal such that the output optical power is made to coincide with the reference output optical power.

In this process, it may be arranged to change the temperature of EDF 3 in unit temperature steps in response to whether the difference is positive or negative, or it may be arranged to change the temperature of EDF 3 in a direction determined by whether the difference is positive or negative by a temperature amount depending on the absolute value of the difference.

In the above description, the reference output optical power constituting the target for control was shown as being supplied from the outside through port C, but it would be possible to take the output optical power obtained by calculation at the design temperature as the reference output optical power and to perform subsequent control operation using this.

Also, rather than forming a temperature control signal based on the difference, it would be possible to form a temperature control signal by incorporating in control circuit 12 for example a correspondence table between the temperature control signal and a combination of the output optical power and the input optical power in respect of the currently employed EDF 3.

(2) Second Method of Forming a Temperature Control Signal

The control circuit 12 of this third embodiment also may be arranged to form a temperature control signal such as to improve the noise factor, instead. Hereinbelow a method of forming a temperature control signal devised with the object of improving the noise factor and also taking into consideration the output optical power will be described with reference to FIG. 3 and FIG. 4 mentioned above.

Control circuit 12 regulates the temperature of the EDF 3 to the design temperature and detects the input optical power and output optical power under these conditions by means of the output signal from photodetector elements 15 and 11. In cases where it is unclear whether or not the design temperature has been accurately achieved, a temperature control signal of a prescribed value, which is midway in the dynamic range, is supplied to the temperature control element 13, and the input optical power and output optical power of EDF 3 are then detected.

Thus, based on the characteristic information shown in FIG. 4 stored in its interior, the noise factor corresponding to this input optical power is ascertained and whether or not this noise factor is smaller than the allowed upper limit value of the noise factor is evaluated and whether or not the detected output optical power is close to the reference output optical power is evaluated.

Thereupon, if the noise factor that is obtained is smaller than the allowed upper limit value of the noise factor, control circuit 12 uses the characteristic information shown in FIG. 3 and FIG. 4 to determine a temperature of EDF 3 such that it can be guaranteed that this is smaller than the allowed upper limit value of the noise factor and the output optical power can approach the reference output optical power. A temperature control signal created for a temperature at which the above is possible is output to the temperature adjustment member 13.

On the other hand, if the noise factor that is obtained is larger than the allowed upper limit value of the noise factor, first of all, the temperature of EDF 3 is controlled such that the detected noise factor obtained from the input optical power information is smaller than the allowed upper limit value of the noise factor; then, the temperature of EDF 3 is controlled such that it can be guaranteed that this is smaller than the allowed upper limit value of the noise factor and that the output optical power can approach the reference output optical power.

It should be noted that it could be arranged for temperature control to be performed only once in each communication, at the commencement of the prescribed period.

Also, although it has been assumed that the allowed upper limit value of the noise factor was supplied from outside, it would be possible to take as the allowed upper limit value of the noise factor a noise factor arrived at by applying a prescribed offset to the noise factor detected at the design temperature, and to perform subsequent control operations using this.

Furthermore, it would be possible to form a temperature control signal by incorporating in control circuit 12 a correspondence table or the like of the temperature control information or signal and the pair information of the input optical power and output optical power of EDF 3 formed beforehand with the object of improving the noise factor. The internally stored information to enable control circuit 12 to form a temperature control signal could be information individual to each EDF 3 incorporated in an EDFA, or could be formed on the basis of the design characteristic for EDF 3.

It should be noted that the method of forming a control signal based on the input optical power and output optical power is not restricted to the two types of method described above. A technique utilizing the temperature dependence of the characteristic shown in FIG. 3 or FIG. 4, or, further, the temperature dependence of a characteristic derived from FIG. 3 or FIG. 4, or other method, could be employed. That is, providing that the method is one whereby a prescribed amplification characteristic or an improved characteristic of the noise factor can be achieved by temperature control of the EDF 3, the method of forming of the temperature control signal based on the input optical power and output optical power is not restricted to the two methods described above.

With an EDFA according to the third embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

(2) Since arrangements are made to obtain the desired characteristic by directly adjusting the temperature of EDF 3, the characteristic of EDF 3 is changed by this directly adjusted temperature rather than by the ambient temperature, so, as a result, an EDFA exhibiting the desired characteristics can be implemented irrespective of fluctuations in ambient temperature.

(D) Fourth Embodiment

In this embodiment, in contrast to the first, second and third embodiments, the temperature information of the optical component itself is detected as the information expressing the quality of the optical characteristic.

A fourth embodiment in which optical components, an optical amplifier and method of controlling the characteristic of an optical amplifier according to the present invention are applied to an EDFA will be described in detail below. The EDFA of this fourth embodiment uses the forward pumping system employing a single-wavelength signal (S signal).

Figure 7:
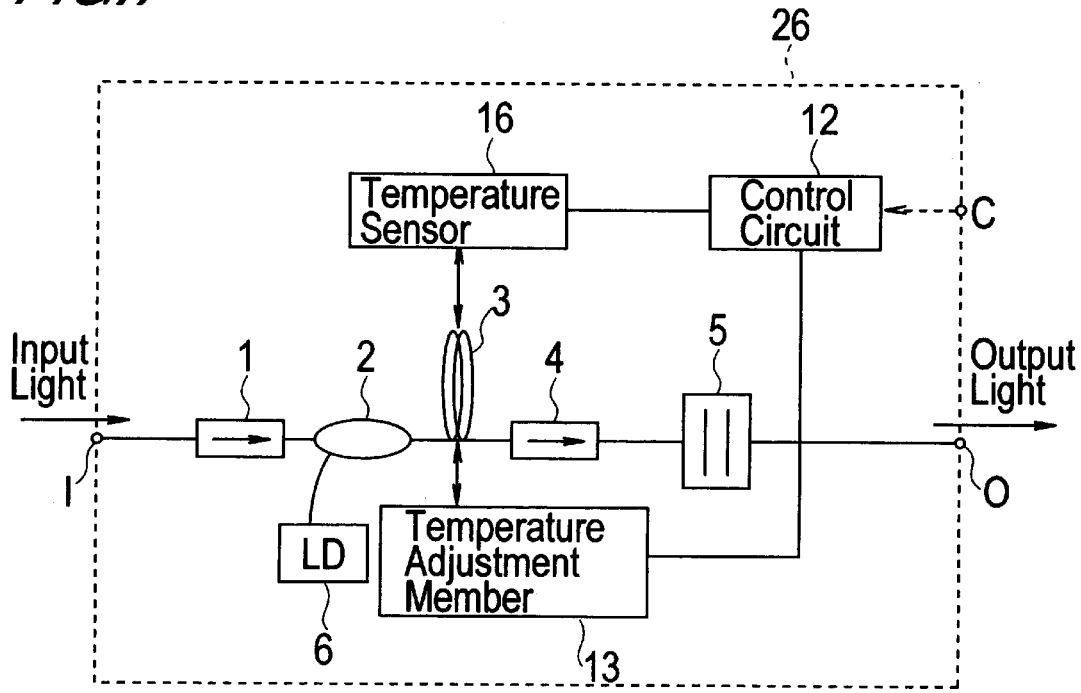
FIG. 7 is a block diagram illustrating the construction of an EDFA according to fourth and eleventh embodiments of the present invention.

FIG. 7 is a block diagram showing the layout of an EDFA according to the fourth embodiment; constitutional elements that are identical with or correspond to Figures described above will be given the same reference numerals.

In FIG. 7, the EDFA 26 of the fourth embodiment comprises an isolator 1, WDM coupler 2, EDF 3, isolator 4, filter 5, pumping source 6, control circuit 12 and temperature adjustment member 13. In this embodiment, the EDFA 26 is provided with a temperature sensor 16 in place of an optical coupler 10 for dividing the output light and a photodetector element (for example PD) 11 of the first embodiment. In the case of this fourth embodiment, the isolator 1, WDM coupler 2, EDF 3, isolator 4 and filter 5 are respectively optical components for an S signal.

Temperature sensor 16 detects the temperature of EDF 3 and its temperature detection signal is supplied to control circuit 12.

Control circuit 12 forms a temperature control signal based on the temperature detection signal and reference temperature information that is set or indicated from outside through port C and supplies this to temperature adjustment member 13.

Temperature adjustment member 13 of the fourth embodiment regulates the temperature of EDF 3 in accordance with the temperature control signal from the control circuit 12. The control signal could be a signal directly indicating temperature, or could be a signal not directly indicating temperature by itself but indicating temperature increase or decrease.

It is preferable that at least the EDF 3, temperature adjustment member 13 and temperature sensor 16 should be heat-insulated from the other structural elements by means of a heat-insulating material or the like. In other words, it is desirable to ensure that the effect of the temperature of the EDF 3, temperature adjustment member 13 and temperature sensor 16 does not affect the other structural elements.

Next, two examples of a method of forming a temperature control signal in the control circuit 12 will be described with reference to the drawings.

(1) First Method of Forming a Temperature Control Signal

FIG. 3 shows the relationship between the EDF input optical power and output optical power, taking the temperature of EDF 3 as a parameter. From FIG. 3, it can be seen that the output optical power with respect to a given input optical power varies somewhat in accordance with the temperature of the EDF 3. The EDFA of the fourth embodiment attempts to control the amplification characteristic, i.e., quality of the amplification characteristic, by utilizing this temperature dependence. An example of a method of control will be described in which when the input optical power is kept constant, the input optical power is kept practically constant irrespective of the ambient temperature.

For example on commencement of communication, first of all, control circuit 12 supplies a temperature control signal of a prescribed value midway in the dynamic range to temperature adjustment member 13 and detects (identifies) the temperature of EDF 3 using the output signal from temperature sensor 16 which is then obtained. It then finds the difference between the detected temperature and the reference temperature. The temperature of EDF 3 is changed by forming a temperature control signal such as to eliminate this difference. Subsequently also, EDF 3 is controlled to the prescribed temperature in accordance with the output signal from temperature sensor 16.

In this case, since it is a presupposition that the input optical power is fixed, constant output optical power can be obtained by controlling the temperature of EDF 3 to a constant level. In such temperature control, fluctuation of the ambient temperature may be considered as a cause of variation of the output signal from temperature sensor 16. However, thanks to the above temperature control, fixed output optical power can be obtained irrespective of fluctuations of ambient temperature.

The reference temperature that is held by control circuit 12 can be adjusted for example prior to shipping in accordance with the characteristic of the EDF 3 that is incorporated in the EDFA. Alternatively, though the reference temperatures of all the EDFAs are made common, it is possible to compensate for the variability of the EDF 3 incorporated in the EDFA by applying an offset dependent on the characteristic of the EDF 3 incorporated in the EDFA to the output signal (temperature detection signal) of the temperature sensor 16.

It may be arranged to perform the temperature control only at a prescribed time after commencement, once in every communication. In this process, it may be arranged to change the temperature of EDF 3 in unit temperature steps in response to whether the difference is positive or negative, or it may be arranged to change the temperature of EDF 3 in a direction determined by whether the difference is positive or negative by a temperature amount depending on the absolute value of the difference. In the above description, the reference temperature constituting the target for control was shown as being supplied from the outside through port C, but it would be possible to take the temperature detected at the commencement of communication as the reference temperature and to perform subsequent control operation using this.

(2) Second Method of Forming a Temperature Control Signal

It is also possible for control circuit 12 to form a temperature control signal such as to improve the noise factor. From FIG. 4 described above, it can be seen that, if the input optical power is fixed, the noise factor varies depending on the temperature. This second method of forming a control signal also assumes that the input optical power is fixed.

First of all, at for example the commencement of communication, control circuit 12 supplies to temperature adjustment member 13 a temperature control signal of a prescribed value midway in the dynamic range and detects the temperature of EDF 3 at this point using the output signal of the temperature sensor 16. It then determines whether or not this detected temperature is smaller than the reference temperature. The reference temperature is a temperature corresponding to the allowed upper limit value of the noise factor at the input optical power which is determined beforehand. If the detected temperature is below the reference temperature, since the noise factor in the output light is below the allowed upper limit value of the noise factor, control circuit 12 maintains the current value of the temperature control signal (FIG. 3 and FIG. 4). On the other hand, if the detected temperature is larger than the reference temperature, since the noise factor that was obtained is larger than the allowed upper limit on the value of the noise factor, control circuit 12 lowers the temperature of EDF 3 by supplying to temperature adjustment member 13 a temperature control signal that is smaller than the previous temperature control signal such as to lower the temperature by an amount corresponding to the difference between the detected temperature and the reference temperature, or a temperature control signal that is smaller than previous temperature control signal by a unit amount. By this temperature drop, the noise factor at the EDF 3 is improved. This operation is constantly executed until the detected temperature becomes smaller than the reference temperature.

Temperature control aimed at controlling the noise factor could be performed only once in each communication, at a fixed period from the start.

In the case described above, it is a presupposition that the input optical power is fixed, so a noise factor of below a fixed value can be achieved by controlling the temperature of EDF 3 to below a reference temperature. In such temperature control, fluctuation of ambient temperature may be considered as a cause of variation of the output signal from the temperature sensor 16, but, thanks to the above temperature control, a noise factor of less than a fixed value can be obtained irrespective of fluctuations in the ambient temperature.

The reference temperature that is held by control circuit 12 can be adjusted for example prior to shipping in accordance with the characteristic of the EDF 3 that is incorporated in the EDFA. Alternatively, though the reference temperatures of all the EDFAs are made common, it is possible to compensate for the variability of the EDF 3 incorporated in the EDFA by applying an offset dependent on the characteristic of the EDF 3 incorporated in the EDFA to the output signal (temperature detection signal) of the temperature sensor 16.

It would also be possible to form a temperature control signal by incorporating in control circuit 12 for example a correspondence table of the temperature control signal with the detected temperature which was formed beforehand with the object of improving the noise factor. The correspondence table of the temperature control signal with the detected temperature which was formed beforehand with the object of improving the noise factor could be individual to each EDF 3 or could be formed based on the design characteristic of the EDF 3.

It should be noted that the method of forming a temperature control signal based on the detected temperature is not restricted to the two types of method described above. A technique utilizing the temperature dependence of the characteristic shown in FIG. 3 or FIG. 4, or, further, the temperature dependence of a characteristic derived from FIG. 3 or FIG. 4, or other method, could be employed.

With an EDFA according to the fourth embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

For example, by storing the information (reference temperature, for example) concerning the characteristics of the EDF 3 which was incorporated in the EDFA and which are detected on shipment, (2) Since arrangements are made to obtain the desired characteristic by directly adjusting the temperature of EDF 3, the characteristic of EDF 3 is changed by this directly adjusted temperature rather than by the ambient temperature, so, as a result, an EDFA exhibiting the desired characteristics can be implemented irrespective of fluctuations in ambient temperature.

(E) Modifications of the First to Fourth Embodiments

The common feature of the first to fourth embodiments described above is that the characteristic of an EDFA that handles a single-wavelength signal (S signal) is controlled to a desired characteristic by temperature control of EDF 3. However, the detection information for forming the temperature control signal was different in each embodiment.

The detection information for forming a temperature control signal is not restricted to that of the first to fourth embodiments described above. Combinations of input optical power, output optical power and detection temperature, which combinations are different from the embodiments described above, could be used as detection information for forming the temperature control signal.

(F) Fifth Embodiment

A fifth embodiment in which optical components, an optical amplifier and method of controlling the characteristic of an optical amplifier according to the present invention are applied to an EDFA will be described in detail below. The EDFA of this fifth embodiment uses the forward pumping system employing a single-wavelength signal (S signal).

Figure 8:
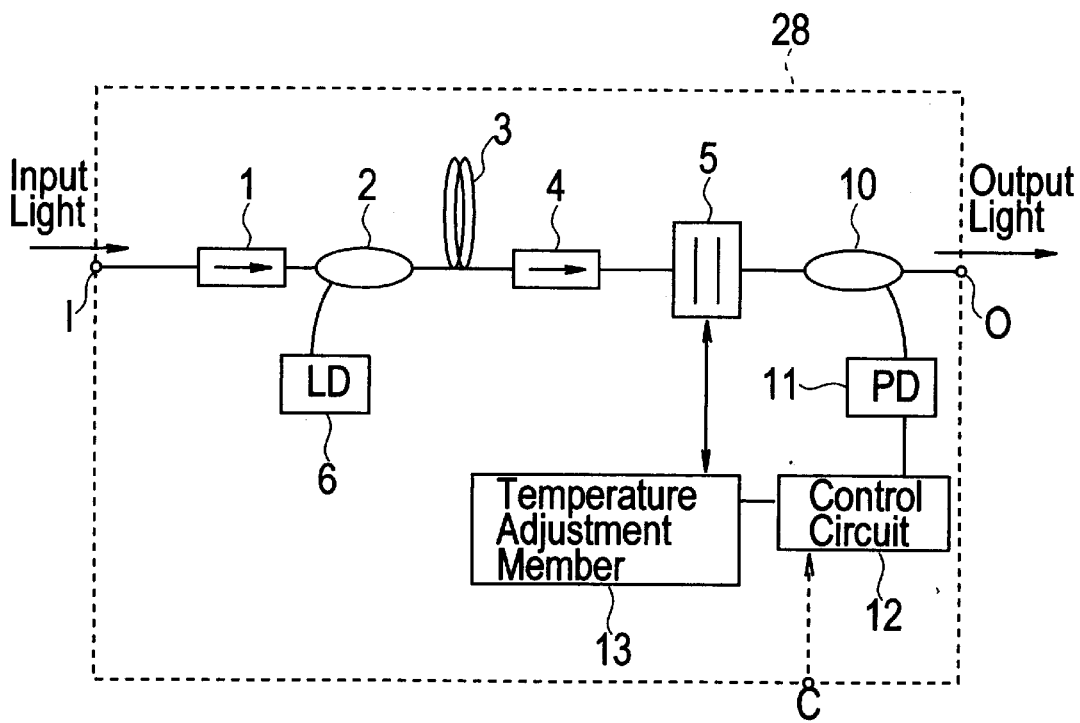
FIG. 8 is a block diagram illustrating the construction of an EDFA according to fifth, twelfth and fifteenth embodiments of the present invention.

FIG. 8 is a block diagram showing the layout of an EDFA according to the fifth embodiment; constitutional elements that are identical with or correspond to Figures described above will be given the same reference numerals.

In FIG. 8, the EDFA 20 of the fifth embodiment comprises an isolator 1, WDM coupler 2, EDF 3, isolator 4, filter 5 and pumping source 6, and is provided with an optical coupler 10 for dividing the output light, a photodetector element (for example PD) 11, a control circuit 12 and a temperature adjustment member 13. In the case of this fifth embodiment, the isolator 1, WDM coupler 2, EDF 3, isolator 4, filter 5, output light dividing optical coupler 10 and photodetector element (for example PD) 11 are respectively optical components for an S signal.

The feature of the EDFA of this fifth embodiment that is different from the EDFA of the first embodiment described above is the constructional element whereby temperature is controlled. Specifically, in the case of this fifth embodiment, a temperature adjustment member 13 is provided linked with the filter 5, the temperature of filter 5 being controlled by means of control circuit 12.

It is preferable that at least the filter 5 and temperature adjustment member 13 should be heat-insulated from the other structural elements by means of a heat-insulating material or the like. In other words, it is desirable to ensure that the effect of the temperature of the filter 5 and temperature adjustment member 13 does not affect the other structural elements.

The filtering characteristic of filter 5 changes, albeit only a little, with temperature. For example, if filter 5 is constituted by a fiber grating, its transmission or optical band pass characteristic has the property of becoming offset towards the longer wavelength side by about 5 nm for a temperature rise of 100° C.

The control circuit 12 of this fifth embodiment changes the temperature of filter 5 in accordance with the detected output optical power at a prescribed wavelength, so as to control the output optical power from this EDFA 28 to a fixed level, or to maintain it above a prescribed value.

For example, if the detected output optical power is smaller than a prescribed output optical power, control circuit 12 lowers the temperature of filter 5, thereby performing control such as to increase the output optical power from the current time-point. On the other hand, contrariwise, if the detected output optical power is larger than the prescribed output optical power, this control circuit 12 raises the temperature of filter 5, thereby exercising control such as to decrease the output optical power from the current time-point.

With an EDFA according to the fifth embodiment described above, the following benefits can be obtained.

(1) So long as control circuit 12 has a construction whereby the necessary information for forming a temperature control signal can be set from outside, even if an individual component such as filter 5 shows a characteristic that slightly departs from the set characteristic, an EDFA having the desired characteristics can be produced without needing to replace these individual components, by setting these items of information corresponding to the individual components in control circuit 12.

For example, by storing information concerning the filtering characteristics of the filter 5 which was incorporated in the EDFA and which are detected on shipment, instead of storing information determined from the set value in respect of filter 5, replacement of individual components (filters) can be made unnecessary. Furthermore, if for example, instead of storing information determined from the set value in respect of filter 5, as the reference information of for example the reference output optical power, the values corresponding to the characteristic information in respect of the filter 5 incorporated in the EDFA and detected on shipping are employed, replacement of individual components can be made unnecessary.

(2) Since arrangements are made to obtain the desired characteristic by directly adjusting the temperature of filter 5, the characteristic of filter 5 is changed by this directly adjusted temperature rather than by the ambient temperature, so, as a result, an EDFA exhibiting the desired characteristics can be implemented irrespective of fluctuations in ambient temperature.

Although in this fifth embodiment temperature control of filter 5 is performed with reference to the detected output optical power, it would be possible to perform temperature control of filter 5 with reference to input optical power, a combination of input optical power and output optical power, or detected temperature etc.

(G) Optical Components that are the Subject of Temperature Control

Although in the first to fourth embodiments, the optical component that was the subject of temperature control was EDF 3 and, in the fifth embodiment, the optical component that was the subject of temperature control was filter 5, it would be possible to exercise temperature control on another optical component, in respect of that optical component only.

For example, it would be possible to make the characteristic of the EDFA approach the desired characteristic by exercising temperature control in respect of any of isolator 1, WDM coupler 2 or isolator 4.

(H) Sixth Embodiment

A sixth embodiment in which optical components, an optical amplifier and method of controlling the characteristic of an optical amplifier according to the present invention are applied to an EDFA will be described in detail below. The EDFA of this sixth embodiment uses the forward pumping system employing a single-wavelength signal (S signal).

Figure 9:
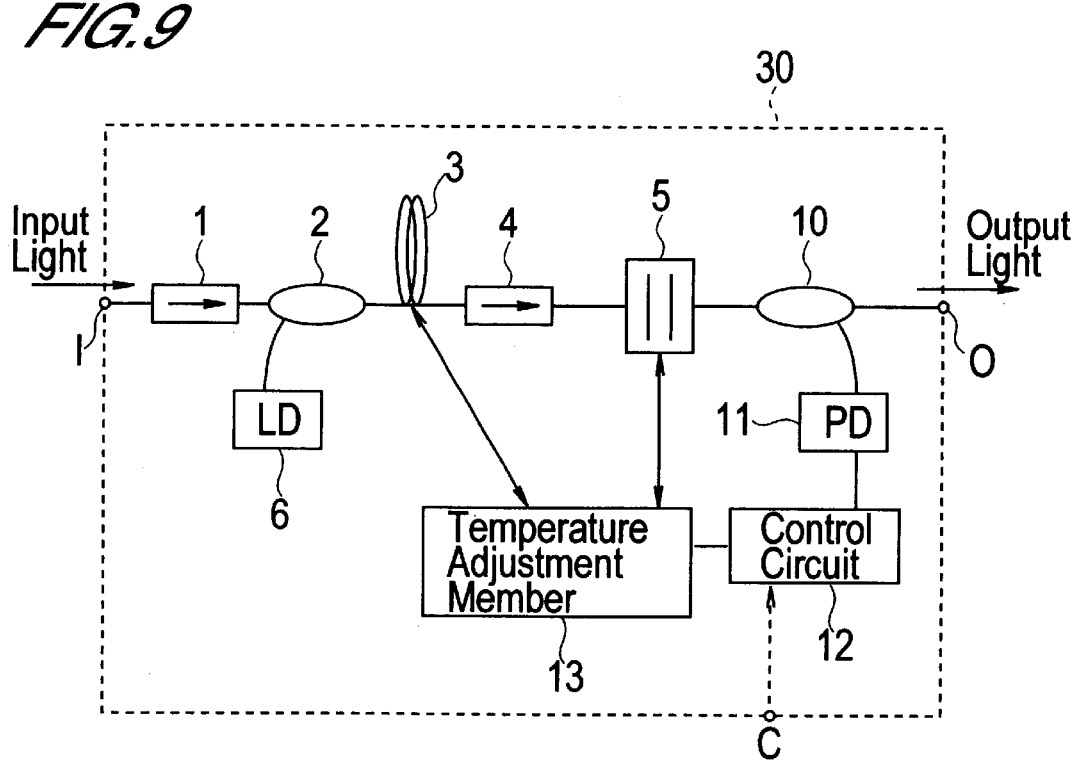
FIG. 9 is a block diagram illustrating the construction of an EDFA according to sixth and thirteenth embodiments of the present invention.

FIG. 9 is a block diagram showing the layout of an EDFA according to the sixth embodiment; constitutional elements that are identical with or correspond to Figures described above will be given the same reference numerals.

In FIG. 9, the EDFA 30 of the sixth embodiment comprises an isolator 1, WDM coupler 2, EDF 3, isolator 4, filter 5 and pumping source 6 and is provided with an optical coupler 10 for dividing the output light, a photodetector element (for example PD) 11, a control circuit 12 and a temperature adjustment member 13. In the case of this sixth embodiment, the isolator 1, WDM coupler 2, EDF 3, isolator 4, filter 5, output light dividing optical coupler 10 and photodetector element (for example PD) 11 are respectively optical components for an S signal.

In the case of the sixth embodiment, not just EDF 3, but also filter 5 is provided with a temperature adjustment member 13. Specifically, the structural elements whereby the characteristics of the EDFA as a whole are changed are EDF 3 and filter 5.

It is preferable that at least the EDF 3, filter 5 and temperature adjustment member 13 should be heat-insulated from the other structural elements by means of a heat-insulating material or the like. In other words, it is desirable to ensure that the effect of the temperature of the EDF 3, filter 5 and temperature adjustment member 13 does not affect the other structural elements.

Control circuit 12 forms a temperature control signal that is applied to temperature adjustment member 13 for example as follows. The example method described below is applied in the case where the input optical power is fixed and is known for the system.

In control circuit 12 there is stored beforehand information describing the correspondence relationship between the detected output optical power and the value of the temperature control signal (for example this information may be embodied as a table). Control circuit 12 extracts a temperature control signal (value) corresponding to the detected output optical power, and supplies this to temperature adjustment member 13.

The information that is stored beforehand by control circuit 12 corresponds to the combined temperature dependence, which is influenced by both the temperature dependence of EDF 3 and the temperature dependence of filter 5.

In this case, control circuit 12 may store information obtained from the design values of the temperature dependence of EDF 3 and the temperature dependence of filter 5, or control circuit 12 may store information obtained from the temperature dependence of EDF 3 and the temperature dependence of filter 5 incorporated in this EDFA. In view of product variability, the latter method is preferable.

Also, the information that is stored beforehand by control circuit 12 may be combined temperature dependence information having in view the temperature dependence of the amplification characteristic both of EDF 3 and filter 5. Also, this stored information may be combined temperature dependence information having in view the temperature dependence of the noise factor characteristic in respect of EDF 3 and having in view the temperature dependence of the amplification characteristic in respect of filter 5. Further, this stored information may be combined temperature dependence information having in view the temperature dependence of the noise factor characteristic in respect of EDF 3 and in respect of filter 5.

Although, in the above description, a construction was illustrated in which a temperature control signal is formed in accordance with the detected output optical power, a construction would also be possible in which the temperature control signal is formed in accordance with the deviation of the detected output optical power from a reference output power.

With an EDFA 30 according to the sixth embodiment described above, the following benefits can be obtained.

(1) So long as control circuit 12 has a construction whereby the necessary information for forming a temperature control signal can be set from outside, even if an individual component such as EDF 3 and filter 5 shows a characteristic that slightly departs from the set characteristic, an EDFA having the desired characteristics can be produced without needing to replace these individual components, by setting these items of information corresponding to the individual components in control circuit 12.

For example, by storing the information determined from the characteristics of the EDF 3 and filter 5 which was incorporated in the EDFA and which are detected on shipment, instead of storing information determined from the set value in respect of EDF 3 and filter 5, replacement of individual components (EDFs and filters) can be made unnecessary.

(2) Since arrangements are made to obtain the desired characteristics by directly adjusting the temperature of EDF 3 and filter 5, the characteristics of EDF 3 and filter 5 are changed by this directly adjusted temperature rather than by the ambient temperature, so, as a result, an EDFA exhibiting the desired characteristics can be implemented irrespective of fluctuations in ambient temperature.

Although in this sixth embodiment temperature control of the EDF 3 and filter 5 is performed with reference to the detected output optical power, it would be possible to perform temperature control of EDF 3 and filter 5 with reference to input optical power, a combination of input optical power and output optical power, or detected temperature etc.

(I) Seventh Embodiment

A seventh embodiment in which optical components, an optical amplifier and method of controlling the characteristic of an optical amplifier according to the present invention are applied to an EDFA 32 will be described in detail below. The EDFA of this seventh embodiment uses the forward pumping system employing a single-wavelength signal (S signal).

Figure 10:
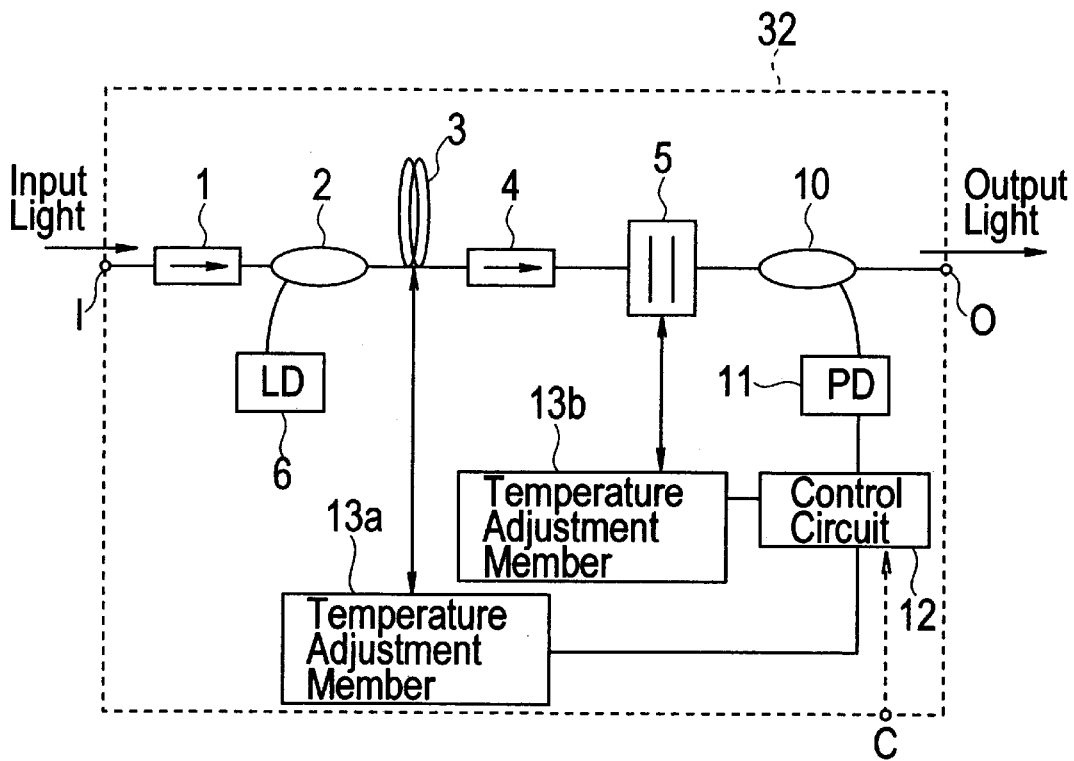
FIG. 10 is a block diagram illustrating the construction of an EDFA according to a seventh embodiment of the present invention.

FIG. 10 is a block diagram showing the layout of an EDFA according to the seventh embodiment; constitutional elements that are identical with or correspond to Figures described above will be given the same reference numerals.

In FIG. 10, the EDFA 32 of the seventh embodiment comprises an isolator 1, WDM coupler 2, EDF 3, isolator 4, filter 5 and pumping source 6 and is provided with an optical coupler 10 for dividing the output light, a photodetector element (for example PD) 11, a control circuit 12 and temperature adjustment members 13a and 13b. In the case of this seventh embodiment, the isolator 1, WDM coupler 2, EDF 3, isolator 4, filter 5, output light dividing optical coupler 10 and photodetector element (for example PD) 11 are respectively optical components for an S signal.

In the case of this seventh embodiment, two temperature adjustment members 13a and 13B are provided. Temperature adjustment member 13a is provided linked to EDF 3, while the other temperature adjustment member 13b is provided linked with filter 5. Specifically, by means of the temperature control, structural elements that change the characteristic of the EDFA 32 as a whole are constituted by EDF 3 and filter 5 and temperature control of the EDF 3 and filter 5 is performed individually.

It is preferable that at least the EDF 3 and temperature adjustment member 13a should be heat-insulated from the other structural elements by means of a heat-insulating material or the like. Also, it is preferable that the filter 5 and temperature adjustment member 13b should be heat-insulated from the other structural elements by means of a heat-insulating material or the like.

Control circuit 12 forms a temperature control signal that is applied to temperature adjustment members 13a and 13b for example as follows. The example method described below is applied in the case where the input optical power is fixed and is known for the system.

In control circuit 12 there is stored beforehand information describing the correspondence relationship between the detected output optical power and the values of the temperature control signals for EDF 3 and filter 5 (for example this information may be embodied as a table). Control circuit 12 extracts each of temperature control signals (values) for EDF 3 and filter 5 corresponding to the detected output optical power, and supplies this to the corresponding temperature adjustment members 13a and 13b.

The value of temperature control signal for EDF 3 that is stored beforehand by control circuit 12 corresponds to the temperature dependence of EDF 3 and the value of temperature control signal for filter 5 that is stored beforehand by control circuit 12 corresponds to the temperature dependence of filter 5. In this case, control circuit 12 may store information obtained from the design values of the temperature dependence of EDF 3 and the temperature dependence of filter 5, or control circuit 12 may store information obtained from the temperature dependence of EDF 3 and the temperature dependence of filter 5 incorporated in this EDFA. In view of product variability, the latter method is preferable.

Also, the information that is stored beforehand by control circuit 12 may be temperature dependence information having in view the temperature dependence of the amplification characteristic in respect of EDF 3 and in respect of filter 5. Also, this stored information may be temperature dependence information having in view the temperature dependence of the noise factor characteristic in respect of EDF 3 and having in view the temperature dependence of the amplification characteristic in respect of filter 5. Further, this stored information may be temperature dependence information having in view the temperature dependence of the noise factor characteristic in respect of EDF 3 and in respect of filter 5.

Although, in the above description, a construction was illustrated in which a temperature control signal is formed in accordance with the detected output optical power, a construction would also be possible in which the temperature control signal is formed in accordance with the deviation of the detected output optical power from a reference output power.

With an EDFA 32 according to the seventh embodiment described above, the following benefits can be obtained.

So long as control circuit 12 has a construction whereby the necessary information for forming a temperature control signal can be set from outside, even if an individual component such as EDF 3 and filter 5 shows a characteristic that slightly departs from the set characteristic, an EDFA having the desired characteristics can be produced without needing to replace these individual components, by setting these items of information corresponding to the individual components in control circuit 12.

For example, by storing information concerning the characteristics of the EDF 3 and filter 5 which was incorporated in the EDFA and which are detected on shipment, instead of storing information determined from the set value in respect of EDF 3 and filter 5, replacement of individual components (EDFs and filters) can be made unnecessary.

(2) Since arrangements are made to obtain the desired characteristics by directly adjusting the temperature of EDF 3 and filter 5, the characteristic of EDF 3 and filter 5 are changed by this directly adjusted temperature rather than by the ambient temperature, so, as a result, an EDFA exhibiting the desired characteristics can be implemented irrespective of fluctuations in ambient temperature.

Although in this seventh embodiment temperature control of EDF 3 and filter 5 is performed with reference to the detected output optical power, it would be possible to perform temperature control of EDF 3 and filter 5 with reference to input optical power, a combination of input optical power and output optical power, or detected temperature etc.

(J) Combination of Optical Components which are the subject of Temperature Control In the sixth embodiment and seventh embodiment described above, the case was illustrated in which the optical components that were the subject of temperature control were the EDF 3 and filter 5; however, where there are a plurality of optical components that are the subject of temperature control, their combinations are not restricted to those of the sixth embodiment and seventh embodiment. Also, the number of optical components that are the subject of temperature control is not restricted to two as in the case of the sixth embodiment and seventh embodiment.

Figure 11:
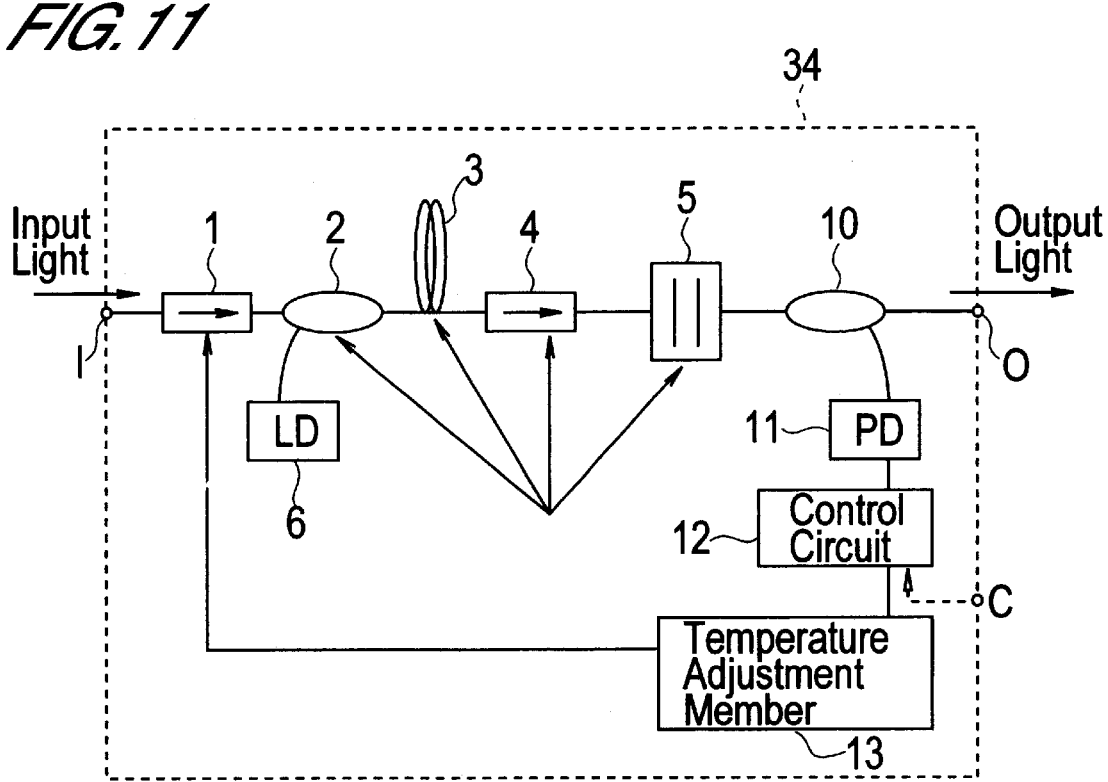
FIG. 11 is a block diagram illustrating the construction of an embodiment of the present invention in which a plurality of optical components are made the subject of temperature control.
Figure 12:
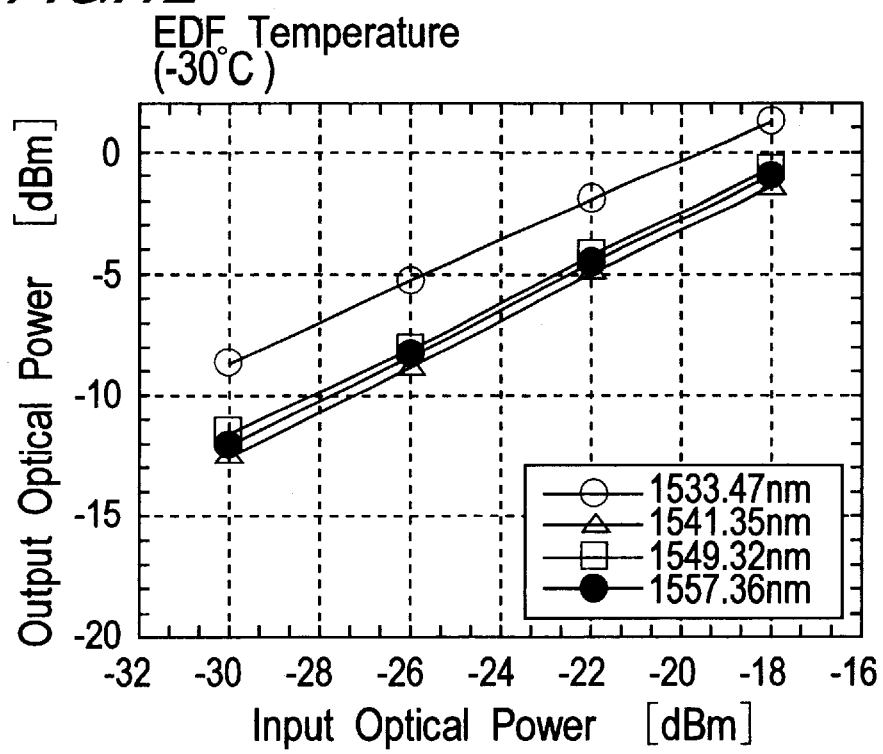
FIG. 12 is a characteristic diagram showing the output optical power characteristic with respect to the input optical power of an EDF at a temperature of −30° C. for the case of a WDM signal, given in explanation of the present invention.
Figure 13:
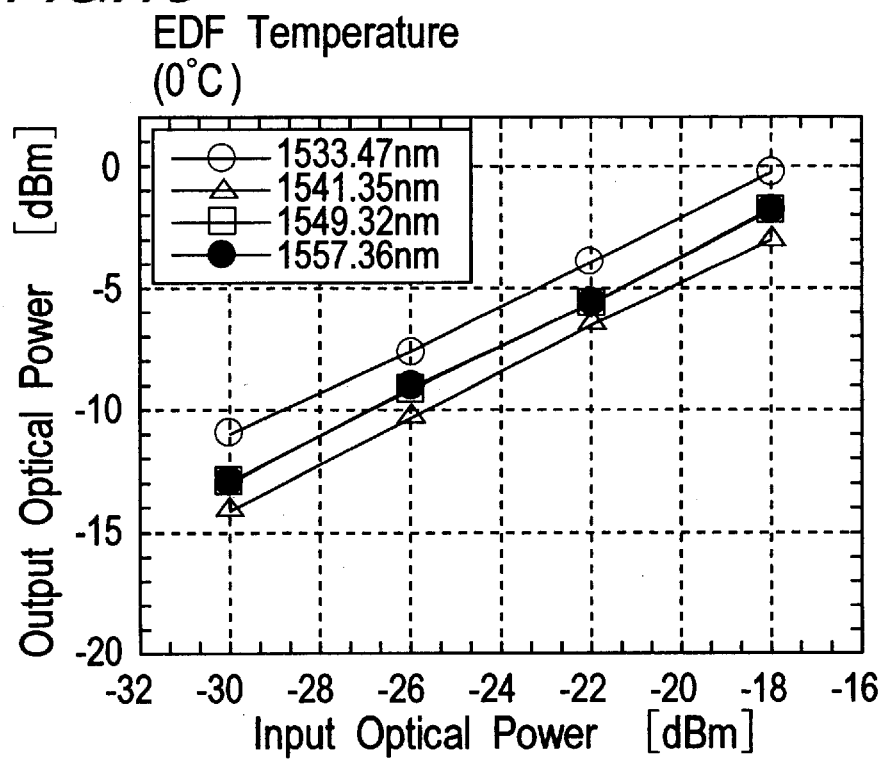
FIG. 13 is a characteristic diagram showing the output optical power characteristic with respect to input optical power of the EDF at a temperature of 0° C. for the case of a WDM signal, given in explanation of the present invention.
Figure 14:
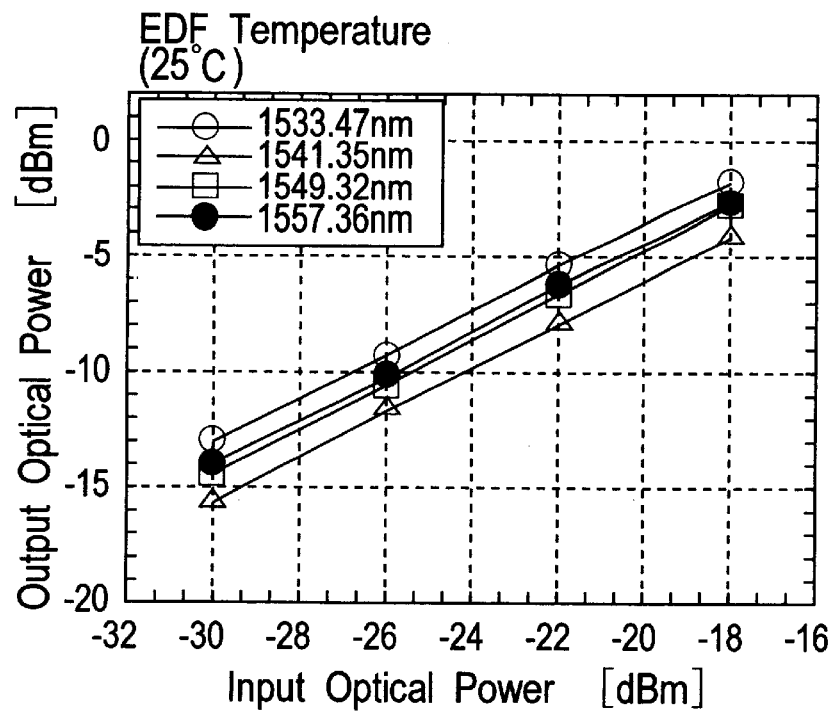
FIG. 14 is a characteristic diagram showing the optical power characteristic with respect to input optical power of the EDF at a temperature of 25° C. for the case of a WDM signal, given in explanation of the present invention.
Figure 15:
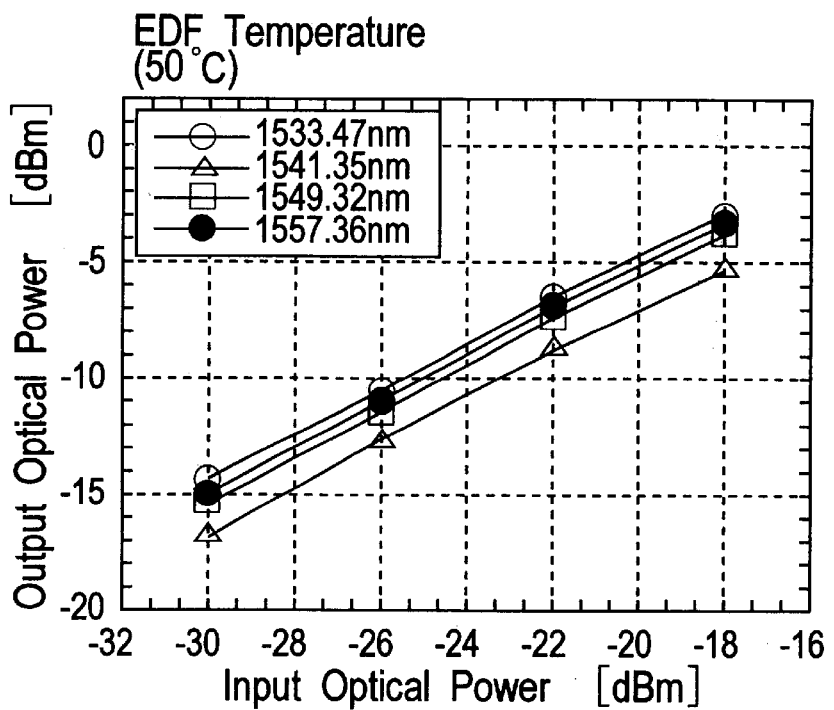
FIG. 15 is a characteristic diagram showing the output optical power characteristic with respect to input optical power of the EDF at a temperature of 50° C. for the case of a WDM signal, given in explanation of the present invention.
Figure 16:
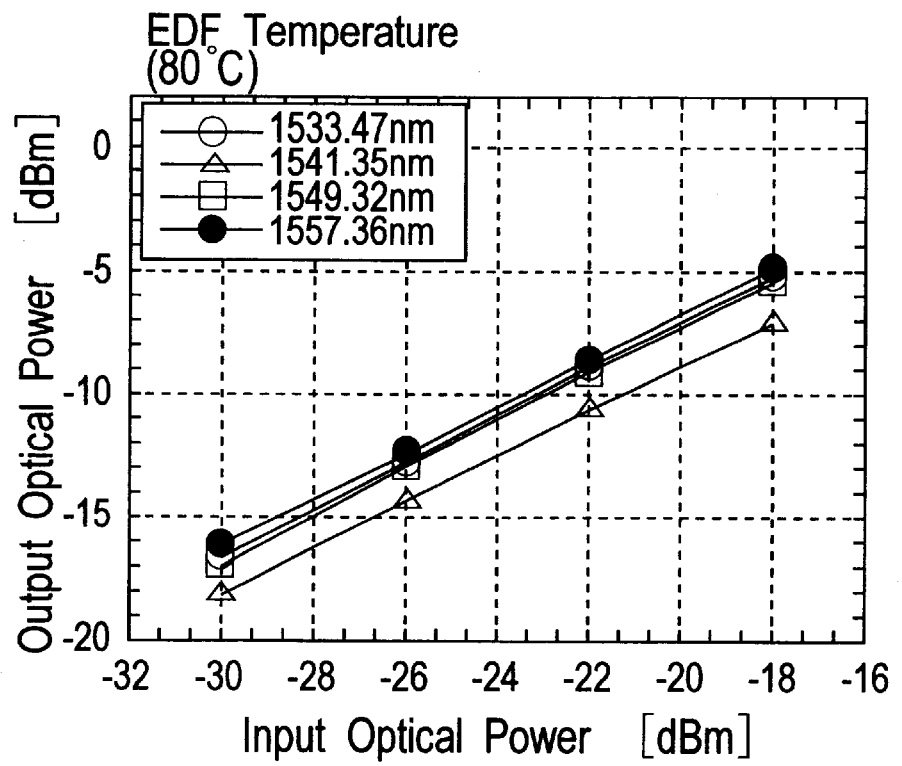
FIG. 16 is a characteristic diagram showing the output optical power characteristic with respect to input optical power of the EDF at a temperature of 80° C. for the case of a WDM signal, given in explanation of the present invention.

For example, it would be possible to make all the optical components 1 to 5 on the main path of the optical signal shown in FIG. 11 the subject of temperature control. The optical components for monitoring may be either included or not included in these optical components. In this connection, while FIG. 11 shows the case where all the optical components 1 to 5 are controlled to the same temperature, it would be possible, as in the case of the seventh embodiment described above, to effect control to individual temperatures for each optical component. Where the optical components are divided into a plurality of groups, it would be possible to effect control to individual temperatures for each group. Furthermore, the monitoring signal for forming the temperature control signal could be any of the input optical power, output optical power or detected temperature, taken alone or in combination. Also, the type of monitoring signal for forming the temperature control signal for each optical component or, where the optical components are divided into a plurality of groups, for each group, could be varied.

(K) Eighth Embodiment

Next, an eighth embodiment wherein the optical components, optical amplifier and method of controlling the characteristic of an optical amplifier according to the present invention are applied to an EDFA will be described in detail with reference to the drawings. The EDFA of this eighth embodiment employs a forward pumping system and handles a wavelength division multiplex signal (WDM signal).

Whereas the first to seventh embodiments were embodiments relating to an EDFA that handled a single-wavelength signal (S signal), the eighth to fourteenth embodiments described below are embodiments related to an EDFA that handles a wavelength division multiplex signal (WDM signal).

FIG. 2 described above was given as a block diagram illustrating the construction of an EDFA according to a first embodiment, but it can be viewed as a block diagram illustrating the construction of an EDFA according to the present eighth embodiment.

Specifically, as shown in FIG. 2, EDFA 20 of this eighth embodiment comprises: isolator 1, WDM coupler 2, EDF 3, isolator 4, filter 5, pumping source 6, optical coupler 10 for output light division, photodetector element (for example PD) 11, control circuit 12 and temperature adjustment member 13.

However, in the case of this eighth embodiment, isolator 1, WDM coupler 2, EDF 3, isolator 4, filter 5, and optical coupler 10 for output light division are respectively for use with a WDM signal. Specifically, isolator 1, WDM coupler 2, EDF 3, isolator 4, filter 5, and optical coupler 10 for output light division are capable of covering the WDM signal band.

Photodetector element 11 may be capable of detecting the output optical power at any one of the plurality of wavelength components of the WDM signal, or may be capable of detecting the output optical power at one or more of the plurality of wavelength components of the WDM signal. The detection wavelength component of the photodetector element 11 may be determined in accordance with the method of forming a temperature control signal of control circuit 12.

In the case of the eighth embodiment, control circuit 12 forms a temperature control signal that is supplied to temperature adjustment member 13, based on the output optical power at each of one or two or more wavelength components of the WDM signal from photodetector element 11.

Next, an example of a method of forming a temperature control signal in control circuit 12 will be described with reference to the drawings.

(1) First Method of Forming a Temperature Control Signal

Figure 17:
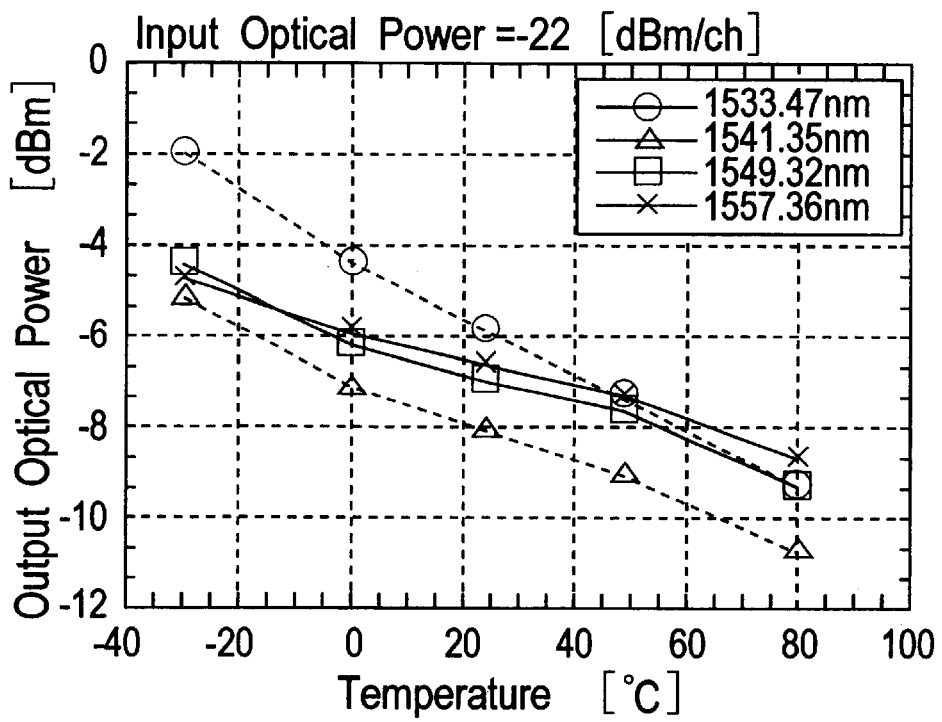
FIG. 17 is a characteristic diagram showing the output optical power characteristic with respect to temperature of the EDF for a WDM signal, given in explanation of the present invention.

FIG. 12 to FIG. 16 respectively show the relationship between input optical power and output optical power of EDF 3 for a WDM signal (four-wavelength multiplexed transmission signal) containing four wavelength components, namely, 1533.47 nm, 1541.35 nm, 1549.32 nm and 1557.36 nm, for temperatures of −30° C., 0° C., 25° C., 50° C. and 80° C. FIG. 17 shows the relationship between the output optical power (vertical axis) and the temperature when the input optical power for each wavelength component (horizontal axis) is −22 dBm/ch. The units of the input optical power are dBm.

It can be seen from these FIG. 12 to FIG. 17 that in the case of a WDM signal also the output optical power for a given input optical power is different depending on the temperature of the EDF 3. In the EDFA of this eighth embodiment it is also sought to control the amplification characteristic by utilizing this temperature dependence in inverse fashion.

As an example of a method of control of the amplification characteristic, an example will be described of a method of control in which the output optical power is kept constant, irrespective of the ambient temperature. In this example method of control, it is assumed that the input optical power is practically fixed.

(1-1) A temperature control signal is formed utilizing the wavelength constituent for monitoring a single wavelength component WDM signal. In this case, the control signal is formed based on a single wavelength component, so the method of forming the temperature control signal of the first embodiment described above with reference to the S signal (method of formation relating to the amplification characteristic) can be directly applied.

As the wavelength component utilized for the formation of such a temperature control signal, of the components of various wavelengths in the WDM signal, for example a component having an intermediate amplification characteristic may be employed. For example, in the case where there are four wavelengths having the amplification characteristics shown in FIG. 12 to FIG. 17, the wavelength component of 1549.32 nm may be employed (see FIG. 17).

In this case, for the amplification characteristic of the wavelength component that is the subject of monitoring, it is necessary to store in memory in control circuit 12 the relationship information with respect to output optical power.

(1-2) If two or more or all of the wavelength components in the WDM signal are taken as the wavelength components for monitoring, a control temperature is found for each of these wavelength components. A temperature control signal designating an average value or center value of these control temperatures is formed. In this case, for determination of the control temperature in respect of each wavelength component, the method of forming a temperature control signal according to the first embodiment (method of formation relating to the amplification characteristic) used in the case of an S signal may be applied without modification.

In this case, information regarding the relationship between the control temperature and output optical power in regard to the amplification characteristic must be stored in memory of control circuit 12 for each respective wavelength component that is the subject of monitoring.

(2) Second Method of Forming a Temperature Control Signal

As an alternative to what is described above, control circuit 12 may be arranged to form a temperature control signal such as to improve the noise factor.

Figure 18:
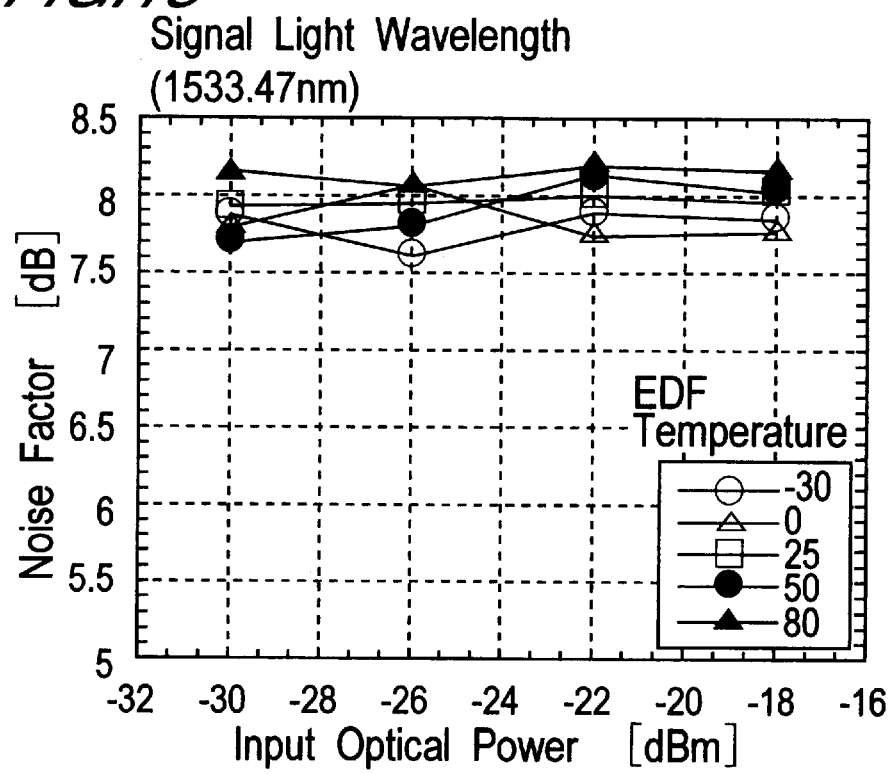
FIG. 18 is a characteristic diagram showing for a plurality of temperatures the noise factor characteristic with respect to input optical power of the EDF for the wavelength component 1533.47 nm of the WDM signal, given in explanation of the present invention.
Figure 19:
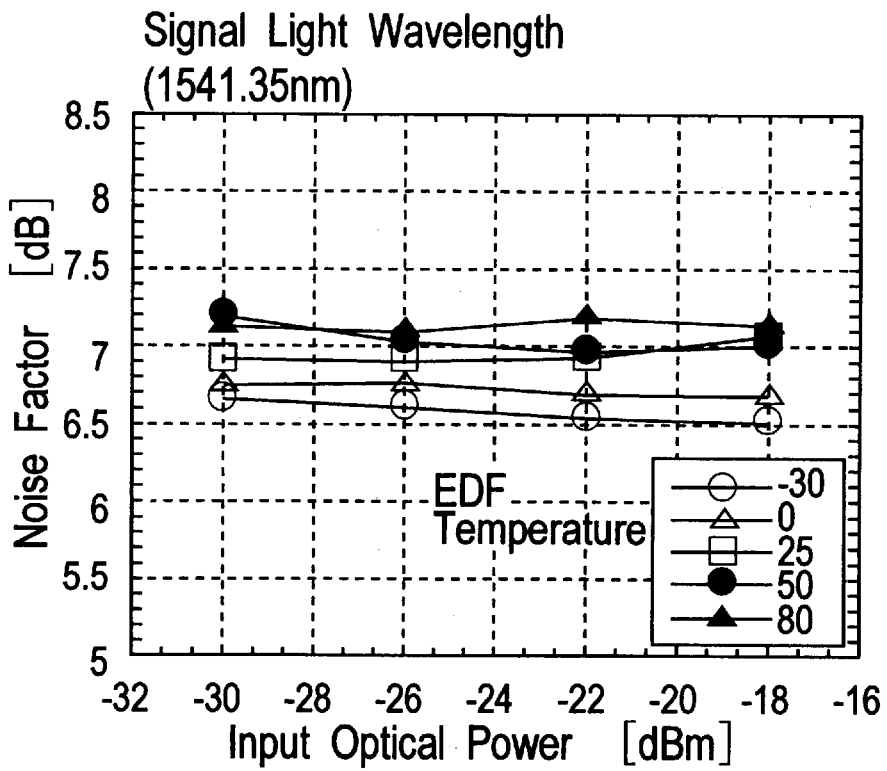
FIG. 19 is a characteristic diagram showing for a plurality of temperatures the noise factor characteristic with respect to input optical power of the EDF for the wavelength component 1541.35 nm of the WDM signal, given in explanation of the present invention.
Figure 20:
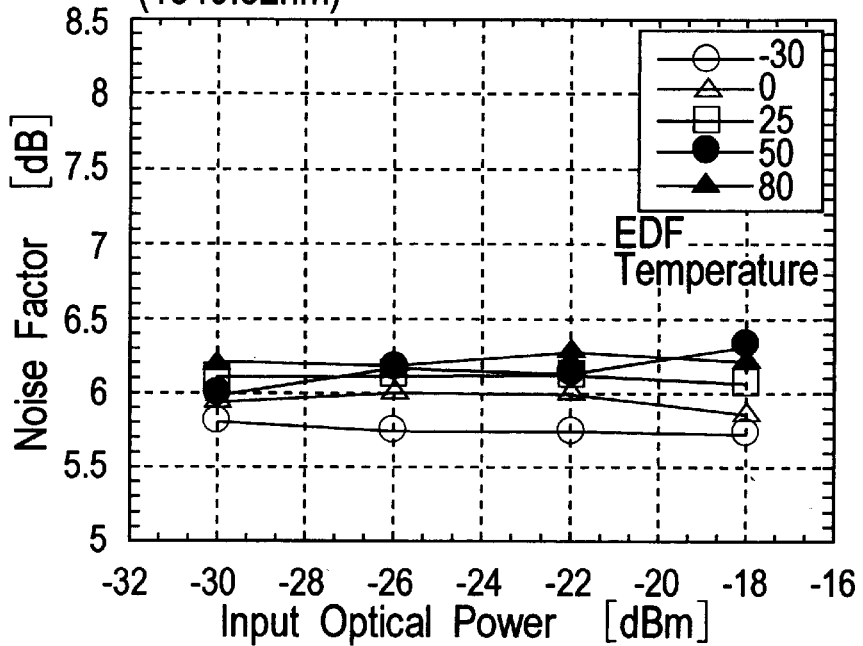
FIG. 20 is a characteristic diagram showing for a plurality of temperatures the noise factor characteristic with respect to input optical power of the EDF for the wavelength component 1549.32 nm of the WDM signal, given in explanation of the present invention.
Figure 21:
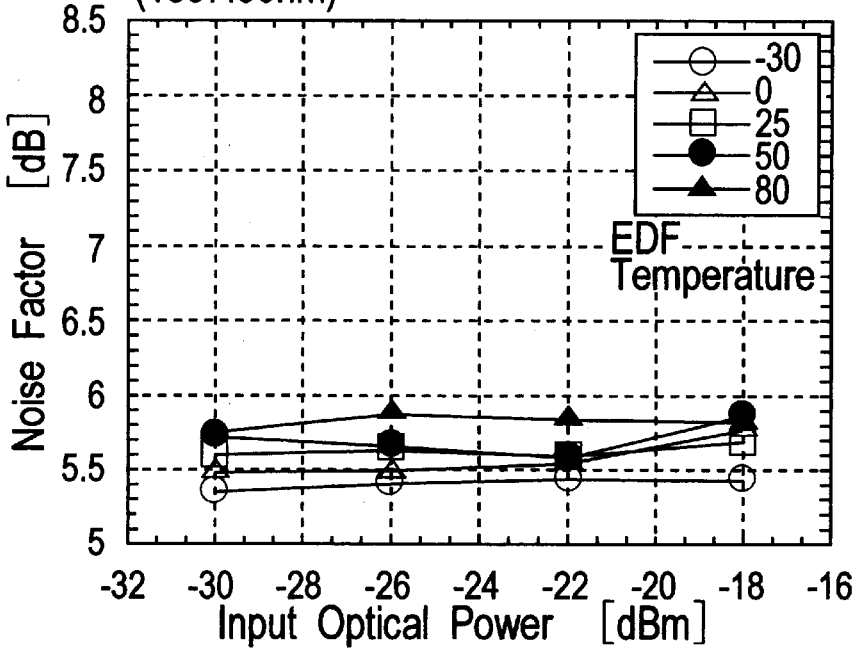
FIG. 21 is a characteristic diagram showing for a plurality of temperatures the noise factor characteristic with respect to input optical power of the EDF for the wavelength component 1557.36 nm of the WDM signal, given in explanation of the present invention.
Figure 22:
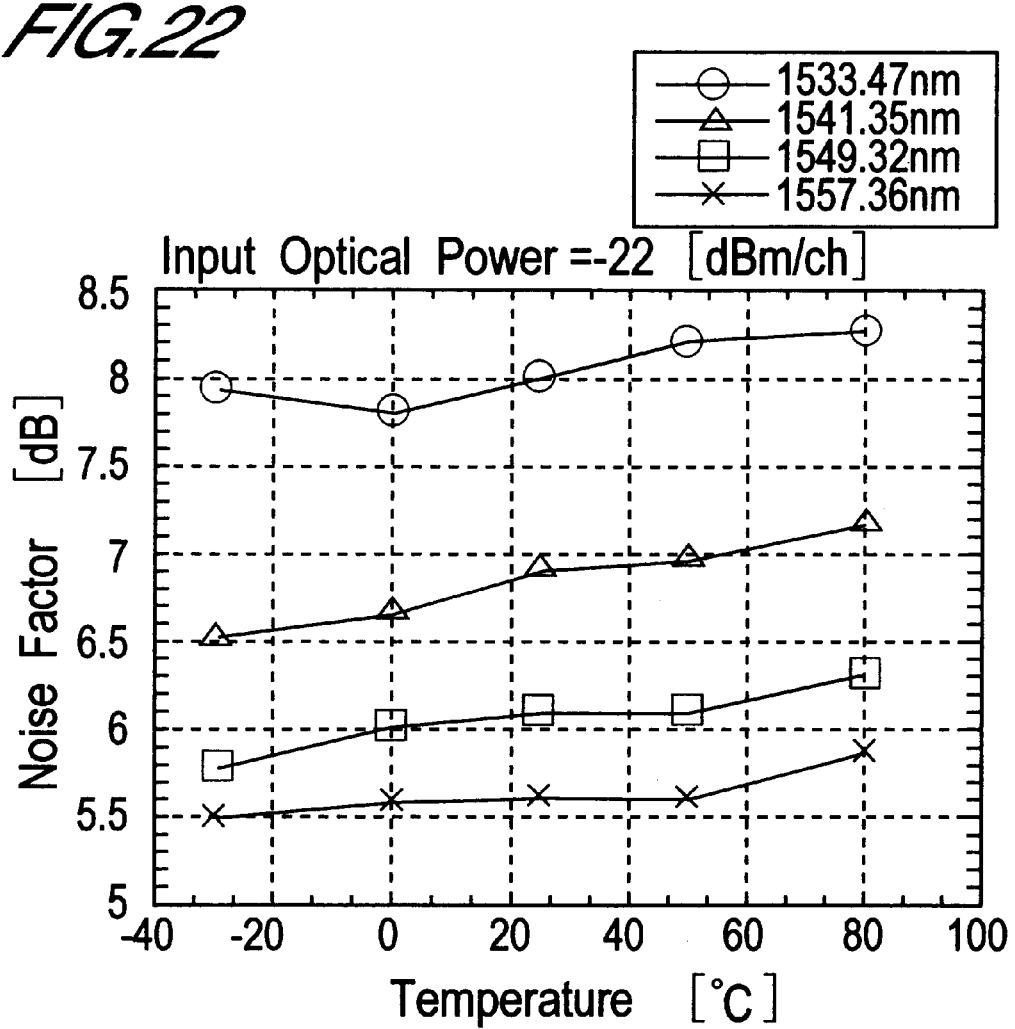
FIG. 22 is a characteristic diagram showing the noise factor characteristic with respect to temperature of the EDF for a WDM signal, given in explanation of the present invention.

FIG. 18 to FIG. 21 illustrate the characteristic of the noise factor (NF) with respect to the input optical power for EDF 3, into which the WDM signal is input, for various temperatures. FIG. 18 shows the case of a wavelength component of 1533.47 nm; FIG. 19 shows the case of a wavelength component of 1541.35 nm; FIG. 20 shows the case of a wavelength component of 1549.32 nm; and FIG. 21 shows the case of a wavelength component of 1557.36 nm. Also, FIG. 22 shows the relationship between temperature and noise factor when the input optical power is −22 dBm/ch, for each wavelength component. In each Figure, the input optical power (dBm) is shown along the horizontal axis, while the noise factor (dB) is shown along the vertical axis.

From these FIG. 18 to FIG. 22, it can be seen that the noise factor changes with temperature even if the input optical power is fixed. It can also be seen that the characteristic of the noise factor with respect to input optical power is different for each wavelength component.

From FIG. 12 to FIG. 17 described above, it can be seen that there is a fixed relationship between input optical power and output optical power, though this varies with temperature.

Although not shown in the drawings, if the relationships of these FIG. 12 to FIG. 17 and FIG. 18 to FIG. 22 are combined, the characteristic of the noise factor output optical power for EDF 3, or, more precisely, the characteristics at various temperatures, can of course be obtained.

The noise factor can be kept below a fixed value by utilizing such temperature dependence characteristic information of the noise factor on the output optical power for EDF 3.

(2-1) A temperature control signal for keeping noise factor below a fixed value is formed utilizing the wavelength constituent for monitoring a single wavelength component WDM signal. In this case, the control signal is formed based on a single wavelength component, so the method of forming the temperature control signal of the first embodiment described above with reference to the S signal (method of formation relating to the noise factor) can be directly applied.

As the wavelength component utilized for the formation of such a temperature control signal, of the components of various wavelengths in the WDM signal, for example a component having a worst noise factor characteristic may be employed. For example, in the case where there are four wavelengths having the amplification characteristics shown in FIG. 18 to FIG. 22, the wavelength component of 1533.47 nm may be employed (see FIG. 22).

In this case, for the noise factor characteristic of the wavelength component that is the subject of monitoring, it is necessary to store in memory in control circuit 12 the relationship information with respect to output optical power and control temperature.

(2-2) If two or more or all of the wavelength components in the WDM signal are taken as the wavelength components for monitoring, a control temperature is found for each of these wavelength components. A temperature control signal designating an average value or center value of these control temperatures is formed. In this case, for determination of the control temperature in respect of each wavelength component, the method of forming a temperature control signal according to the first embodiment (method of formation relating to the noise factor characteristic) used in the case of an S signal may be applied without modification.

In this case, the relationship information between the output optical power and control temperature relating to the noise factor characteristic of the wavelength component that is the subject of monitoring must be stored in memory of the control circuit 12.

(3) Third Method of Forming a Temperature Control Signal

The wavelength-dependent output power difference of the optical characteristic is an important factor that is different for a WDM signal than for an S signal. Control circuit 12 may form a temperature control signal such that the wavelength-dependent output power difference, i.e., a value representing its quality, is below a prescribed value.

FIG. 17 described above may be viewed as a characteristic illustrating the wavelength-dependent output power difference of a WDM signal. In the example of FIG. 17, the wavelength-dependent output power difference is the smallest at about 50° C. The wavelength-dependent output power difference becomes larger as the temperature becomes lower than 50° C. The wavelength-dependent output power difference becomes larger as the temperature becomes higher than 50° C. If the intended temperature of use (design temperature) is taken as being 25° C., the wavelength-dependent output power difference becomes larger as the temperature becomes lower than this design temperature of 25° C.

A method of forming a temperature control signal utilizing the wavelength-dependent output power difference and taking the input optical power of each wavelength component as equal will now be described.

First of all, at for example the commencement of communication, the temperature of EDF 3 is adjusted to the design temperature and the output optical power at each wavelength component is then detected. If it is unclear whether or not the design temperature has been precisely achieved, a temperature control signal of prescribed value in the middle in the dynamic range is applied to the temperature adjustment member 13 and the output optical power of each wavelength component is then detected. The difference between the maximum value and minimum value of these output optical powers, i.e., the wavelength-dependent output power difference, is thereby ascertained, and an evaluation is made as to whether this wavelength-dependent output power difference is or is not smaller than the upper limit value of the allowed wavelength-dependent output power difference.

If the wavelength-dependent output power difference thus obtained is smaller than the allowed upper limit value of the wavelength-dependent output power difference, control circuit 12 holds the current value of the temperature control signal. On the other hand, if the wavelength-dependent output power difference that is obtained is greater than the upper limit value of the allowed wavelength-dependent output power difference, control circuit 12 lowers the temperature of EDF 3 by supplying to temperature adjustment member 13 a temperature control signal that is smaller than the previous temperature control signal such as to lower the temperature by amount corresponding to the difference from the allowed upper limit value, or a temperature control signal that is smaller by unit temperature than the previous temperature control signal. By means of this temperature drop, the wavelength-dependent output power difference at the EDF 3 is improved.

Subsequently in the same way the operation of improving the wavelength-dependent output power difference by monitoring the output optical power of each wavelength component is executed. It is possible to perform the control operation once only during each communication, at a prescribed time after the start.

Although it was assumed that the allowed upper limit value of the wavelength-dependent output power difference was supplied from outside, it would also be possible to take the value of the wavelength-dependent output power difference detected at the design temperature, with a prescribed offset added thereto as the allowed upper limit value of the wavelength-dependent output power difference, and to use this in subsequent control operations.

It would also be possible to form a temperature control signal by incorporating in control circuit 12 for example a correspondence table of the temperature control signal with the output optical power which was formed beforehand with the object of improving the wavelength-dependent output power difference. The correspondence table of the temperature control signal with the output optical power which was formed beforehand with the object of improving the wavelength-dependent output power difference could be individual to each EDF 3 or could be formed based on the design characteristic of the EDF 3.

In the above description, in order to obtain the actual value of the wavelength-dependent output power difference, the output optical powers at all the wavelength components were monitored. However, whatever the temperature, if the wavelength component at which the maximum output optical power is obtained and the wavelength component at which the minimum output optical power is obtained are fixed, it suffices to monitor only the output optical powers of these.

With an EDFA according to the eighth embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

For example, by storing the information as shown in FIGS. 12 to 17 or FIGS. 18 to 22, i.e., information concerning the characteristics of the EDF 3 which was incorporated in the EDFA and which are detected on shipment, instead of storing information determined from the set value in respect of EDF 3, replacement of individual components (EDFs) can be made unnecessary. Furthermore, if for example, instead of storing information determined from the set value in respect of EDF 3, as the reference information of for example the reference output optical power, the values corresponding to the characteristic information in respect of the EDF 3 incorporated in the EDFA and detected on shipping are employed, replacement of individual components can be made unnecessary.

(2) Since arrangements are made to obtain the desired characteristic by directly adjusting the temperature of EDF 3, the characteristic of EDF 3 is changed by this directly adjusted temperature rather than by the ambient temperature, so, as a result, an EDFA exhibiting the desired characteristics can be implemented irrespective of fluctuations in ambient temperature.

(3) A desirable characteristic of wavelength-dependent output power difference for WDM signal can be obtained through temperature control.

(L) Ninth Embodiment

A ninth embodiment in which optical components, an optical amplifier and method of controlling the characteristic of an optical amplifier according to the present invention are applied to an EDFA will be described in detail below. The EDFA of this ninth embodiment uses the forward pumping system employing a wavelength division multiplexing signal (WDM signal).

Although FIG. 5 is a block diagram showing the layout of an EDFA according to the second embodiment, FIG. 5 is also a block diagram showing the layout of an EDFA according to the ninth embodiment.

In FIG. 5, the EDFA of the ninth embodiment comprises an isolator 1, WDM coupler 2, EDF 3, isolator 4, filter 5 and pumping source 6, an optical coupler 14 for dividing the input light, a photodetector element (for example PD) 15, a control circuit 12 and a temperature adjustment member 13.

However, in the case of this ninth embodiment, isolator 1, WDM coupler 2, EDF 3, isolator 4, filter 5, and optical coupler 14 for input light division are respectively for use with a WDM signal. Specifically, isolator 1, WDM coupler 2, EDF 3, isolator 4, filter 5, and optical coupler 14 for input light division are capable of covering the WDM signal band.

Photodetector element 15 may be capable of detecting the input optical power at any one of the plurality of wavelength components of the WDM signal, or may be capable of detecting the input optical power at one or more of the plurality of wavelength components of the WDM signal. The detection wavelength component of the photodetector element 15 may be determined in accordance with the method of forming a temperature control signal of control circuit 12.

In the case of the ninth embodiment, control circuit 12 forms a temperature control signal that is supplied to temperature adjustment member 13, based on the input optical power at each of one or two or more wavelength components of the WDM signal from photodetector element 15.

In the case of this ninth embodiment also, control circuit 12 forms a temperature control signal with the aim of making a characteristic such as for example the amplification characteristic, noise factor or wavelength-dependent output power difference a desired characteristic.

(1) First Method of Forming a Temperature Control Signal

There is the same relationship between the method of forming a temperature control signal for controlling the amplification characteristic in this ninth embodiment and the method of formation of the second embodiment as there is between for example the method of formation of the first embodiment described with reference to an S signal and the method of formation of the eighth embodiment described with reference to a WDM signal.

Specifically, when a temperature control signal is formed using a first wavelength component in the WDM signal (input light) as the wavelength component for monitoring, the method of formation of the temperature control signal of the second embodiment (method of formation relating to amplification characteristic) for the case of an S signal may be applied without modification. Also, in the case where a temperature control signal is formed utilizing as wavelength component for monitoring all, or two or more, of the wavelength components in the WDM signal, by applying the method of formation of the temperature control signal of the second embodiment described above with reference to an S signal (method of formation relating to the amplification characteristic), control temperatures can be found for each wavelength component, and a temperature control signal is formed designating the mean value or central value of these.

(2) Second Method of Forming a Temperature Control Signal

There is the same relationship between the method of forming a temperature control signal for controlling the noise factor characteristic in this ninth embodiment and the method of formation of the second embodiment as there is between for example the method of formation of the first embodiment described with reference to an S signal and the method of formation of the eighth embodiment described with reference to a WDM signal.

Specifically, when a temperature control signal is formed using a first wavelength component in the WDM signal (input light) as the wavelength component for monitoring, the method of formation of the temperature control signal of the second embodiment (method of formation relating to noise factor characteristic) for the case of an S signal may be applied without modification. Also, in the case where a temperature control signal is formed utilizing as wavelength component for monitoring all, or two or more, of the wavelength components in the WDM signal, by applying the method of formation of the temperature control signal of the second embodiment described above with reference to an S signal (method of formation relating to the noise factor characteristic), control temperatures can be found for each wavelength component, and a temperature control signal is formed designating the mean value or central value of these.

(3) Third Method of Forming a Temperature Control Signal

For example the following two methods may be mentioned as methods of forming a temperature control signal for controlling the wavelength-dependent output power difference.

(3-1) In an initial condition such as for example the communication stand-by condition, control circuit 12 supplies to temperature adjustment member 13 a temperature control signal such that the temperature of EDF 3 becomes the design temperature.

When communication is commenced, control circuit 12 obtains the input optical power based on the detection signal of photodetector element 15. This input optical power could be obtained for any of the wavelength components of the WDM signal, or could be a mean value of the input optical power for a plurality of wavelength components of the WDM signal. The wavelength-dependent output power difference at the design temperature for the input optical power obtained may then be found by utilizing the characteristic information shown in FIG. 17 and stored in the incorporated storage unit. An evaluation is then made as to whether or not this wavelength-dependent output power difference is less than the allowed upper limit value of the wavelength-dependent output power difference.

If then the wavelength-dependent output power difference thus obtained is smaller than the allowed upper limit value of the wavelength-dependent output power difference, control circuit 12 holds the current value of the temperature control signal. On the other hand, if the wavelength-dependent output power difference which is obtained is greater than the upper limit value of the allowed wavelength-dependent output power difference, control circuit 12 lowers the temperature of EDF 3 by supplying to temperature adjustment member 13 a temperature control signal that is smaller than the previous temperature control signal such as to lower the temperature by amount corresponding to the difference from the allowed upper limit value, or a temperature control signal that is smaller by unit temperature than the previous temperature control signal. By means of this temperature drop, the quality of the wavelength-dependent output power difference at the EDF 3 is improved.

Subsequently in the same way the operation of improving the wavelength-dependent output power difference by indirectly monitoring the wavelength-dependent output power difference by utilizing the input optical power is executed. It is possible to perform the temperature control once only during each communication, at a prescribed time after the start.

(3-2) In the initial condition such as the communication standby condition etc., control circuit 12 supplies to temperature adjustment member 13 a temperature control signal such that the temperature of EDF 3 becomes the design temperature.

When communication is commenced, control circuit 12 obtains input optical power at each wavelength component of the WDM signal in response to the detection signal of photodetector element 15. The output optical power at the design temperature for this input optical power which is obtained at each wavelength component is then found by utilizing the characteristic information shown in FIG. 12 to FIG. 16 stored in the storage unit incorporated in the control circuit. The difference between the maximum value and minimum value of these output optical powers, i.e., the wavelength-dependent output power difference, is then determined, and an evaluation made as to whether or not this wavelength-dependent output power difference is smaller than the allowed upper limit value of the wavelength-dependent output power difference.

If the wavelength-dependent output power difference thus obtained is smaller than the allowed upper limit value of the wavelength-dependent output power difference, control circuit 12 holds the current value of the temperature control signal. On the other hand, if the wavelength-dependent output power difference that is obtained is greater than the upper limit value of the allowed wavelength-dependent output power difference, control circuit 12 lowers the temperature of EDF 3 by supplying to temperature adjustment member 13 a temperature control signal that is smaller than the previous temperature control signal such as to lower the temperature by an amount corresponding to the difference from the allowed upper limit value, or a temperature control signal that is smaller by unit temperature than the previous temperature control signal. By means of this temperature drop, the quality of the wavelength-dependent output power difference at the EDF 3 is improved.

Subsequently in the same way the operation of improving the wavelength-dependent output power difference by utilizing the input optical power to indirectly monitor the output optical power of each wavelength component is executed. It is possible to perform temperature control once only during each communication, at a prescribed time after the start.

With an EDFA according to the ninth embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

(2) Since arrangements are made to obtain the desired characteristic by directly adjusting the temperature of EDF 3, the characteristic of EDF 3 is changed by this directly adjusted temperature rather than by the ambient temperature, so, as a result, an EDFA exhibiting the desired characteristics can be implemented irrespective of fluctuations in ambient temperature.

(3) A desirable characteristic of wavelength-dependent output power difference for WDM signal can be obtained through temperature control.

(M) Tenth Embodiment

A tenth embodiment in which optical components, an optical amplifier and method of controlling the characteristic of an optical amplifier according to the present invention are applied to an EDFA will be described in detail below. The EDFA of this tenth embodiment uses the forward pumping system employing a wavelength division multiplexing signal (WDM signal).

Although FIG. 6 is a block diagram showing the layout of an EDFA according to the third embodiment, FIG. 6 is also a block diagram showing the layout of an EDFA according to the tenth embodiment.

In FIG. 6, the EDFA of the tenth embodiment comprises an isolator 1, WDM coupler 2, EDF 3, isolator 4, filter 5 and pump in g source 6, an optical coupler 10 for dividing the output light, a photodetector element (for example PD) 11, an optical coupler 14 for dividing the input light, a photodetector element 15, a control circuit 12 and a temperature adjustment member 13.

However, in the case of this tenth embodiment, isolator 1, WDM coupler 2, EDF 3, isolator 4, filter 5, optical coupler 10 for output light division and optical coupler 14 for input light division are respectively for use with a WDM signal. Specifically, isolator 1, WDM coupler 2, EDF 3, isolator 4, filter 5, and optical couplers 10 and 14 are capable o of covering the WDM signal band.

Photodetector elements 11 and 15 may be capable of detecting the output or input optical power at any one of the plurality of wavelength components of the WDM signal, or may be capable of detecting the input or output optical power at one or more of the plurality of wavelength components of the WDM signal. The detection wavelength component of the photodetector elements 11 and 15 may be determined in accordance with the method of forming a temperature control signal of control circuit 12.

In the case of the tenth embodiment, control circuit 12 forms a temperature control signal that is supplied to temperature adjustment member 13, based on the output optical power and input optical power at each of one or two or more wavelength components of the WDM signals from photodetector elements 11 and 15.

In the case of this tenth embodiment also, control circuit 12 forms a temperature control signal with the aim of making a characteristic such as for example the amplification characteristic, noise factor or wavelength-dependent output power difference a desired characteristic.

(1) First Method of Forming a Temperature Control Signal

There is the same relationship between the method of forming a temperature control signal for controlling the amplification characteristic in this tenth embodiment and the method of formation of the third embodiment as there is between for example the method of formation of the first embodiment described with reference to an S signal and the method of formation of the eighth embodiment described with reference to a WDM signal.

Specifically, when a temperature control signal is formed using a first wavelength component in the WDM signal (input light and output light) as the wavelength component for monitoring, the method of formation of the temperature control signal in the third embodiment (method of formation relating to amplification characteristic) for the case of an S signal may be applied without modification. Also, in the case where a temperature control signal is formed utilizing as wavelength component for monitoring all, or two or more, of the wavelength components in the WDM signal, by applying the method of formation of the temperature control signal of the third embodiment described above with reference to an S signal (method of formation relating to the amplification characteristic), control temperatures can be found for each wavelength component, and a temperature control signal is formed designating the mean value or central value of these.

(2) Second Method of Forming a Temperature Control Signal

There is the same relationship between the method of forming a temperature control signal for controlling the noise factor characteristic in this tenth embodiment and the method of formation of the third embodiment as there is between for example the method of formation of the first embodiment described with reference to an S signal and the method of formation of the eighth embodiment described with reference to a WDM signal.

Specifically, when a temperature control signal is formed using a first wavelength component in the WDM signal (input light and output light) as the wavelength component for monitoring, the method of formation of the temperature control signal in the third embodiment (method of formation relating to noise factor characteristic) for the case of an S signal may be applied without modification. Also, in the case where a temperature control signal is formed utilizing as wavelength component for monitoring all, or two or more, of the wavelength components in the WDM signal, by applying the method of formation of the temperature control signal of the third embodiment described above with reference to an S signal (method of formation relating to the noise factor characteristic), control temperatures can be found for each wavelength component, and a temperature control signal is formed designating the mean value or central value of these.

(3) Third Method of Forming a Temperature Control Signal

For example the following method may be mentioned as method of forming a temperature control signal for controlling the wavelength-dependent output power difference.

FIG. 17 described above shows the relationship between the temperature and the output optical power at each wavelength component for an input optical power of −22 dBm/ch, but, in the case of this tenth embodiment, there is stored in the memory of control circuit 12 not just the information shown in FIG. 17 when the input optical power is −22 dBm/ch but also the information concerning the relationship of temperature and output optical power for each wavelength component as shown in FIG. 17 at the other input optical powers.

First of all, for example at the start of communication, the input optical power is ascertained by means of detection signal of the photodetector element 15 and the relationship information between the temperature and output optical power at each wavelength component to be used in formation of the temperature control signal is determined. After this, in the same way as in the eighth embodiment, a temperature control signal for controlling the wavelength-dependent output power difference is formed based on this output optical power.

With an EDFA according to the tenth embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

(2) Since arrangements are made to obtain the desired characteristic by directly adjusting the temperature of EDF 3, the characteristic of EDF 3 is changed by this directly adjusted temperature rather than by the ambient temperature, so, as a result, an EDFA exhibiting the desired characteristics can be implemented irrespective of fluctuations in ambient temperature.

(3) A desirable characteristic of wavelength-dependent output power difference for WDM signal can be obtained through temperature control.

(N) Eleventh Embodiment

An eleventh embodiment in which optical components, an optical amplifier and method of controlling the characteristic of an optical amplifier according to the present invention are applied to an EDFA will be described in detail below with reference to the drawings. The EDFA of this eleventh embodiment uses the forward pumping system employing a wavelength division multiplexing signal (WDM signal).

Although FIG. 7 is a block diagram showing the layout of an EDFA according to the fourth embodiment, FIG. 7 is also a block diagram showing the layout of an EDFA according to the eleventh embodiment.

In FIG. 7, the EDFA of the eleventh embodiment comprises an isolator 1, WDM coupler 2, EDF 3, isolator 4, filter 5, pumping source 6, temperature sensor 16, control circuit 12 and temperature adjustment member 13.

However, in the case of this eleventh embodiment, isolator 1, WDM coupler 2, EDF 3, isolator 4 and filter 5 are respectively for use with a WDM signal. Specifically, isolator 1, WDM coupler 2, EDF 3, isolator 4 and filter 5 are capable of covering the WDM signal band.

Control circuit 12 forms a temperature control signal based for example on a temperature detection signal and supplies this to temperature adjustment member 13. In the case of this eleventh embodiment, control circuit 12 stores the relationship information of the detection temperature (or reference temperature) and the temperature control signal determined considering the case of a WDM signal. The information that is stored in control circuit 12 consists of the relationship information of the detection temperature (or reference temperature) and the temperature control signal determined beforehand having in view the amplification characteristic, noise factor characteristic, or wavelength-dependent output power difference for the case of a WDM signal.

As described above, the information that is stored in control circuit 12 is determined having in view the amplification characteristic, noise factor characteristic, or wavelength-dependent output power difference. However, the method of formation of the temperature control signal utilizing this information once it has been stored is identical irrespective of whether the characteristic that is intended to be the subject of control is the amplification characteristic, noise factor characteristic or wavelength-dependent output power difference, and is identical with the method of formation of the fourth embodiment described above.

Since, in the case of the fourth embodiment described above, the signal light is an S signal, no temperature control signal can be formed with wavelength-dependent output power difference in view. A brief description of a method of forming a temperature control signal with wavelength-dependent output power difference in view will therefore now be described.

It can be seen from FIG. 17 described above that when the input optical power is fixed the wavelength-dependent output power difference is different depending on temperature. The EDFA of this eleventh embodiment aims to control the wavelength-dependent output power difference by utilizing this temperature dependence inversely. A method of control when the input optical power is practically fixed (method of forming a temperature control signal) will now be described.

At the start of communication, for example, first of all, control circuit 12 applies a temperature control signal of prescribed value midway in the dynamic range to temperature adjustment member 13, and detects (recognizes) the temperature of the EDF 3 by using the output signal from temperature sensor 16 which is then obtained. It then finds the difference between the detected temperature and the reference temperature, and varies the temperature of EDF 3 by forming a temperature control signal such as to eliminate this difference. Subsequently also control is performed in accordance with the output signal from temperature sensor 16 such that EDF 3 is made to have the prescribed temperature.

In this case, since it is a presupposition that the input optical power is fixed, a wavelength-dependent output power difference of below a prescribed value can be obtained by controlling the temperature of EDF 3 to a fixed value. In such temperature control, fluctuation of the ambient temperature may be considered as a cause of variation of the output signal from temperature sensor 16. However, thanks to the above temperature control, a wavelength-dependent output power difference of below a prescribed value can be obtained irrespective of fluctuations of ambient temperature.

By adjusting the reference temperature that is held by control circuit 12 for example prior to shipping in accordance with the characteristic of the EDF 3 that is incorporated in the EDFA, or by applying an offset dependent on the characteristic of the EDF 3 incorporated in the EDFA to the output signal (temperature detection signal) of the temperature sensor 16, whose reference temperature is common to all the EDFAs, it is possible to compensate for the product variability of the EDF 3 incorporated in the EDFA.

It may be arranged to perform the temperature control only in a prescribed time from commencement, once in every communication. The temperature may be changed in unit temperature steps in response to whether the difference is positive or negative, or may be changed in a direction determined by whether the difference is positive or negative by a temperature amount depending on the absolute value of the difference. In the above description, the reference temperature constituting the target for control was shown as being supplied from the outside, but it would be possible to take the temperature detected at the start of communication as the reference temperature and to perform subsequent control operation using this.

With an EDFA according to the eleventh embodiment described above, the following benefits can be obtained.

(1) So long as control circuit 12 has a construction whereby the necessary information for forming a temperature control signal can be set from outside, even if an individual component such as EDF 3 shows a characteristic that slightly departs from the set characteristic, an EDFA having the desired characteristics can be produced without needing to replace these individual components, by setting these items of information corresponding to the individual components in control circuit 12.

For example, by storing the information concerning the characteristics of the EDF 3 which was incorporated in the EDFA and which are detected on shipment, replacement of individual components (EDFs) can be made unnecessary.

(2) Since arrangements are made to obtain the desired characteristic by directly adjusting the temperature of EDF 3, the characteristic of EDF 3 is changed by this directly adjusted temperature rather than by the ambient temperature, so, as a result, an EDFA exhibiting the desired characteristics can be implemented irrespective of fluctuations in ambient temperature.

(3) A desirable characteristic of wavelength-dependent output power difference for WDM signal can be obtained through temperature control.

(O) Examples of Modifications of the Eighth to Eleventh Embodiments

The eighth to eleventh embodiments described above have in common that the characteristic of an EDFA handling wavelength division multiplex signals (WDM signals) is made to have a desired quality; however, the detected information used for forming the temperature control signal was different.

The detection information for forming the temperature control signal is not restricted to that of the above eighth to eleventh embodiments. Different combinations of the detected input optical power, detected output optical power and detected temperature to those used in the above embodiments could be used as the detection information for forming the temperature control signal.

(P) Twelfth Embodiment

In the eighth to eleventh embodiments described above, the amplification characteristic, noise factor characteristic or wavelength-dependent output power difference in the case of a WDM signal were made to have a desired quality by controlling the temperature of EDF 3. However, in the twelfth embodiment, although a detailed description will not be given, as shown in FIG. 8 described above, the subject of temperature control is made to be filter 5 and a desired quality of the amplification characteristic, noise factor characteristic or wavelength-dependent output power difference is achieved by controlling the temperature of filter 5.

Although FIG. 8 was given as a block diagram illustrating the construction of an EDFA according to a fifth embodiment handling an S signal, it could equally be viewed as a block diagram of the construction of an EDFA handling a WDM signal according to the present twelfth embodiment.

The method of forming a temperature control signal is identical with that of the eighth embodiment described above, so further description thereof is omitted.

The benefits of this twelfth embodiment are identical with the benefits of the eighth to eleventh embodiments described above, so a description thereof is omitted.

(Q) Optical Components that are the Subject of Temperature Control

Although in the eighth to eleventh embodiments where the signal light was a WDM signal, the optical component that was the subject of temperature control was EDF 3 and, in the twelfth embodiment, where the signal light was a WDM signal, the optical component that was the subject of temperature control was filter 5, temperature control could be performed for other optical components, solely in respect of these optical components.

For example, the characteristic of the EDFA can be made to approach the desired characteristic by performing temperature control on one or other of an isolator 1 constructed for WDM signal use, a WDM coupler 2 or isolator 4.

(R) Thirteenth Embodiment

In the eighth to twelfth embodiments described above, a desired quality of the amplification characteristic, noise factor characteristic or wavelength-dependent output power difference in respect of a WDM signal was achieved by temperature control of a single optical component (EDF 3 or filter 5). However, in the thirteenth embodiment, although details will be omitted, as shown in FIG. 9 described above, a desired quality of the amplification characteristic, noise factor characteristic or wavelength-dependent output power difference in respect of a WDM signal is achieved with the subject of temperature control being a plurality of optical components (EDF 3 and filter 5).

Although FIG. 9 was given as a block diagram illustrating the construction of an EDFA according to a sixth embodiment handling an S signal, it could equally be viewed as a block diagram of the construction of an EDFA according to the present thirteenth embodiment handling a WDM signal.

The method of forming a temperature control signal is identical with a fusion of the methods of formation of the sixth and eighth embodiments described above, so further description thereof is omitted.

The benefits of this thirteenth embodiment are practically identical with the benefits of the eighth to twelfth embodiments described above, so further description thereof is omitted.

(S) Fourteenth Embodiment

In the thirteenth embodiment described above, a desired quality of amplification characteristic, noise factor characteristic or wavelength-dependent output power difference in respect of a WDM signal was achieved by controlling two optical components (EDF 3 and filter 5) to the same temperature. However, in the case of this fourteenth embodiment, although a detailed description will be omitted, a desired quality of amplification characteristic, noise factor characteristic or wavelength-dependent output power difference in respect of a WDM signal is achieved as shown in FIG. 10 described above, by taking as the subject of temperature control a plurality of optical components (EDF 3 and filter 5) which are capable of being controlled to different temperatures.

Although FIG. 10 was given as a block diagram illustrating the construction of an EDFA according to a seventh embodiment handling an S signal, it could equally be viewed as a block diagram of the construction of an EDFA handling a WDM signal according to the present fourteenth embodiment.

The method of forming a temperature control signal is identical with a fusion of the methods of formation of the seventh and eighth embodiments described above, so further description thereof is omitted.

The benefits of this fourteenth embodiment are identical with the benefits of the eighth to thirteenth embodiments described above, so further description thereof is omitted.

(T) Combination of Optical Components which are the Subject of Temperature Control Although in the thirteenth embodiment and fourteenth embodiment described above, where the signal light is a WDM signal, the optical components that were the subject of temperature control were shown as being EDF 3 and filter 5, where there are a plurality of optical components that are the subject of temperature control, their combinations are not restricted to those of the thirteenth embodiment and fourteenth embodiment.

Also, even where the signal light is a WDM signal, the number of optical components that are the subject of temperature control is not restricted to two as in the thirteenth embodiment and fourteenth embodiment.

For example, even where the signal light is a WDM signal, all the optical components 1 to 5 on the main path of the optical signal as shown in FIG. 11 could be made the subject of temperature control (this may include, or may not include, the optical components for monitoring). In FIG. 11, all the optical components 1 to 5 are shown as being controlled to the same temperature, but, as in the case of the fourteenth embodiment described above, it would be possible to perform control such as to produce individual temperatures in each of the optical components, or, in the case where the optical components are divided into a plurality of groups, in each of these groups. Furthermore, the monitoring signal for forming a temperature control signal could be any of the input optical power, output optical power, or detected temperature, either alone or taken in combination, and the type of monitoring signal for forming the temperature control signal could be changed for each optical component, or, where the optical components are divided into a plurality of groups, for each group.

(U) Fifteenth Embodiment

Next, a fifteenth embodiment in which an optical component, optical amplifier and method of characteristic control of an optical amplifier according to the present invention are applied to an EDFA will be briefly described with reference to the drawings. The EDFA of this fifteenth embodiment uses a forward pumping system to handle a wavelength division multiplex signal (WDM signal). In the following description, FIG. 8 will be used as a layout diagram of the fifteenth embodiment.

This fifteenth embodiment relates to an EDFA in which filter 5 is made the subject of temperature control.

Figure 23:
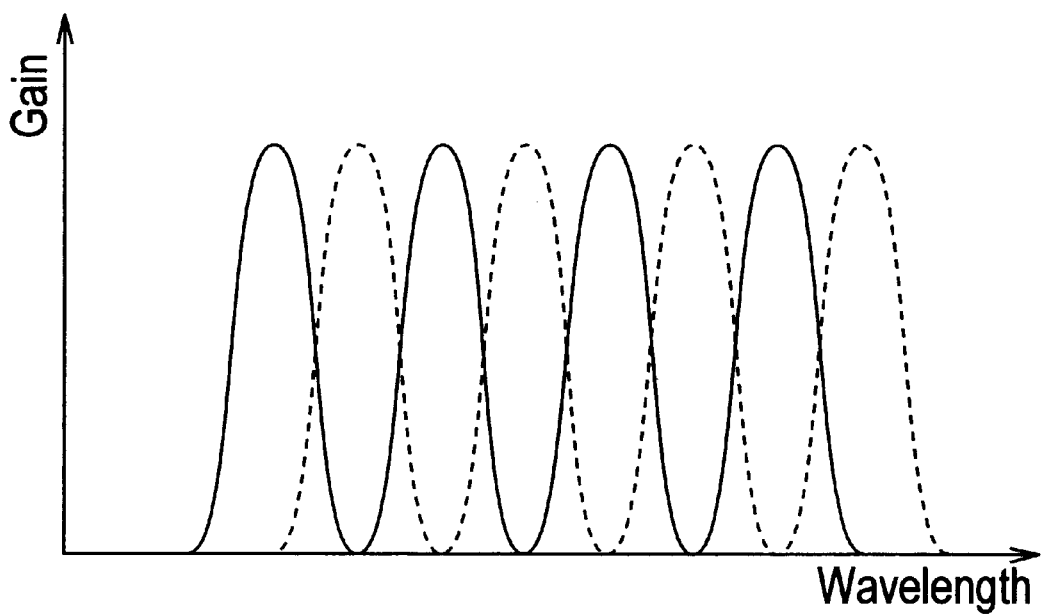
FIG. 23 is a conceptual characteristic diagram showing the optical band pass characteristic of a filter according to a fifteenth embodiment, given in explanation of the present invention.

Filter 5 has a comb-tooth-shaped transmission characteristic as shown by the solid line in FIG. 23, so as to pass only the effective wavelength components in the WDM signal. The solid line characteristic shows the transmission characteristic at the design temperature, but, as described above, the filtering characteristic of filter 5 varies with temperature, albeit only slightly. For example, if filter 5 is constituted by a fiber grating, its transmission or optical bass band characteristic has the property of being displaced towards the longer wavelength side by about 5 nm for a rise in temperature of 100° C. Consequently, if the temperature of filter 5 is made a prescribed high temperature, its transmission characteristic becomes as shown by the broken line in FIG. 23.

In regard to the original wavelength components of the WDM signal, this transmission characteristic as shown by the broken line is a characteristic that blocks transmission.

Control circuit 12, if, for example, output from the EDFA is permitted from outside, causes signal light to be output from this EDFA by supplying to temperature adjustment member 13 a temperature control signal that specifies a temperature in the region of the design temperature (see the solid-line characteristic of FIG. 23).

On the other hand, if output from the EDFA from outside is prohibited, the output of signal light from this EDFA is blocked by supplying to temperature adjustment member 13 a temperature control signal that specifies the prescribed high temperature (see the solid-line characteristic of FIG. 23).

It should be noted that this could be combined with control during transmission of optical signal through EDFA such as to achieve a desired amplification characteristic, noise factor characteristic or wavelength-dependent output power difference, by varying the temperature in a narrow range around the design temperature.

Since in this fifteenth embodiment the range of temperature variation of filter 5 is extremely large, the temperature adjustment member 13 must be a member having a wide adjustment range and a rapid rate of temperature variation.

In addition to providing the same benefits as the eighth to fourteenth embodiments, the EDFA of the fifteenth embodiment has the benefit that output of signal light/output inhibition control can be achieved by temperature control.

The technical concept of this fifteenth embodiment, i.e., the technical concept of performing signal light output/output inhibition by temperature control of filter 5, is applicable to EDFAs that handle an S signal.

(V) Other Embodiments

In the above, many embodiments have been described and embodiments have also been described obtained by modifying part of these embodiments. However, the present invention is not restricted to these, and the following further embodiments may be given.

In each of the above embodiments, the invention was applied to an EDFA (EDFA device) constituted with a single amplification stage (EDFA stage). However, the invention could also be applied to an EDFA having two amplification stages. In such cases, a temperature control construction could be provided for all of the amplification stages, or a temperature control construction could be provided for only some of the amplification stages, such as the last amplification stage. Also, even in cases where respective control constructions are provided for a plurality of amplification stages, some of the amplification stages could be equipped with a temperature control construction devised with the amplification characteristic in view while the remaining stages are equipped with a temperature control construction devised with the noise factor characteristic in view, the characteristics to be the subject of control thus being different.

Also, although in the above embodiments EDFAs using the forward pumping system were illustrated, EDFAs using a backwards pumping system or bi-directional pumping system could be employed. Also, for combining the signal light and pumping light, a polarization combination system could be employed, or it would be possible to use wavelength multiplexing for the pumping light itself. Specifically, any desired method could be used as the pumping method. In the case of an EDFA having two amplification stages, it is not necessary for the method of pumping to be the same for each amplification stage.

Furthermore, although, in the above, monitoring of the power of the signal light was shown as being performed at the input light and/or output light stage, monitoring could be performed at another stage. For example, the power of the signal light could be monitored midway between EDF 3 and filter 5.

Furthermore, although, in the above embodiments, in order to form the temperature control signal, some physical property (input optical power, output optical power, or temperature of a prescribed optical component) was shown as being detected, a construction could be adopted in which a temperature control signal is constantly supplied from outside. In this case, "outside" corresponds to setting means such as a dip switch or to a communication information receiving construction.

Also, although, in the above, where a temperature control signal in respect of a plurality of optical components is formed, the case was illustrated where a temperature control signal was formed in respect of each of the optical components, it would be possible for temperature control signals for each of the optical components to be formed using different detection signals. Further, although, in the above embodiments, the case was illustrated in which the present invention was applied to an EDFA, it would for example be possible to apply it to an optical fiber amplifier having an amplification medium (optical fiber) doped with another rare earth element, such as a praseodymium-doped optical fiber amplifier or neodymiumdoped optical fiber amplifier.

Also, the temperature control of the present invention could be applied to optical components applied to other than optical amplifiers. Furthermore, the present invention could be applied to all optical devices equipped with optical components that involve optical characteristics having temperature dependence.

As described above, an optical component according to a first aspect of the present invention comprises: (1) an optical component body that outputs emitted light by performing prescribed optical processing on input light and having temperature dependence of a prescribed optical characteristic; (2) a temperature adjustment member for changing the temperature of the optical component body in accordance with an input temperature control signal; and (3) a characteristic control circuit that provides in respect of the temperature adjustment member a temperature control signal to control a prescribed optical characteristic of the optical component body. As a result, the optical characteristic of the optical device in which this optical component is incorporated can easily be altered through temperature control of this optical component or the value of the optical characteristic can be stabilized.

As a result, even if for example the optical characteristic in the optical device in which this optical component is incorporated is not the desired characteristic, replacement of this optical component can be made unnecessary.

In an optical amplifier according to a second aspect of the present invention in which are cascade-connected a plurality of optical components including an optical amplification medium that amplifies input signal light, there are provided (1) a temperature adjustment member for changing the temperature of one or a plurality of optical components in accordance with an input temperature control signal; (2) a characteristic control member that supplies in respect of the temperature adjustment member a temperature control signal that controls a prescribed optical characteristic having temperature dependence in one or a plurality of optical components that are the subject of adjustment by the temperature adjustment member, being a prescribed optical characteristic that is demanded for this optical amplifier; thus, the prescribed optical characteristic of this optical amplifier can easily be altered through temperature control of this one or plurality of optical components or can be stabilized.

As a result, even if for example the value of the optical characteristic in the optical device in which this optical component is incorporated is not the desired characteristic, replacement of some of the optical components which are constituent elements thereof can be made unnecessary.

In a method of controlling the quality of the characteristic of an optical amplifier according to a third aspect of the present invention in which are cascade-connected a plurality of optical components including an optical amplification medium that amplifies input signal light, (1) a temperature control signal that controls the value of a prescribed optical characteristic having temperature dependence in one or a plurality of optical components, being a prescribed optical characteristic that is demanded for the optical amplifier, is supplied in respect of the temperature adjustment member, (2) the temperature of this optical component is made to change in accordance with the temperature control signal that is input to one or a plurality of optical components that are the subject of adjustment by the temperature adjustment member, and (3) the prescribed optical characteristic value that is demanded for the optical amplifier is made the desired value. Thus, by temperature control of one or a plurality of optical components, the prescribed value of the optical characteristic of this optical amplifier can easily be altered or stabilized.

As a result, even if for example the value of the prescribed optical characteristic in this optical amplifier is not the desired characteristic, replacement of some of the optical components which are constituent elements thereof can be made unnecessary.

What is claimed is:

1. An optical component comprising:
   an optical component body on an optical path for performing optical processing on inputted light and for outputting emitted light, wherein said optical component body has an optical characteristic of a prescribed type that depends on temperature;
   a characteristic control circuit operable to generate and output a temperature control signal; and
   a temperature adjustment member for adjusting the temperature of said optical component body to an adjustment temperature based on the temperature control signal out putted by said characteristic control circuit;
   wherein said characteristic control circuit comprises
      an optical characteristic monitoring section at a prescribed position on the optical path operable to detect quality information that expresses the quality of the optical characteristic of the prescribed type of said optical component body, and for generating a detection output indicative of the detected quality information, and
      a characteristic control section operable to generate the temperature control signal by utilizing the detection output from said optical characteristic monitoring section,
      wherein said optical characteristic monitoring section comprises a construction operable to detect as the quality information the power of the light before the light has passed through said optical component body.

2. An optical component of claim 1, wherein said optical characteristic monitoring section comprises a construction operable to detect as the quality information the power of the light after the light has passed through said optical component body.

3. An optical component of claim 1, wherein said optical characteristic monitoring section comprises a construction operable to detect as said information the temperature of said optical component body.

4. An optical component of claim 1, wherein said optical component body comprises at least one component selected from the group of components: isolator, WDM coupler, optical amplification medium, and filter.

5. An optical component of claim 1, wherein said temperature adjustment member is a heating body capable of being mounted on said optical component body.

6. An optical component of claim 5, wherein said heating body is a plate-shaped body including a Peltier element of heat pipe.

7. An optical component of claim 1, wherein said temperature adjustment member includes heat insulating material for thermally insulating said temperature adjustment member from surroundings of said temperature adjustment member.

8. An optical component of claim 1, wherein the optical characteristic of the prescribed type is at least one characteristic selected from the group of characteristics: amplification characteristic, noise factor characteristic, wavelength-dependent output power difference, and filtering characteristic.

9. An optical component of claim 4, wherein said optical amplification medium is an optical fiber doped with a rare earth element.

10. An optical amplifier operable to obtain an optically amplified signal by optical amplification of an input light signal and to output the optically amplified signal as an output optical signal, said optical amplifier comprising:

an optical system comprising a plurality of optical components including an optical amplification medium, at least one of said optical components being an optical component body located on an optical path and having an optical characteristic of a prescribed type that depends on temperature;

a characteristic control circuit operable to generate and output a temperature control signal; and a temperature adjustment member for adjusting the temperature of said optical component body to an adjustment temperature based on the temperature control signal outputted by said characteristic control circuit;

wherein said characteristic control circuit comprises an optical characteristic monitoring section at a prescribed position on the optical path operable to detect quality information that expresses the quality of the optical characteristic of the prescribed type of said optical component body, and for generating a detection output indicative of the detected quality information, and a characteristic control section operable to generate the temperature control signal by utilizing the detection output from said optical characteristic monitoring section, wherein said optical characteristic monitoring section comprises a construction operable to detect as the quality information the power of the light before the light has passed through said optical component body.

11. An optical amplifier of claim 10, wherein said optical characteristic monitoring section comprises a construction operable to detect as the quality information the power of the light after the light has passed through said optical component body.

12. An optical amplifier of claim 10, wherein said optical characteristic monitoring section comprises a construction operable to detect as said information the temperature of said optical component body.

13. An optical amplifier of claim 10, wherein said optical component body comprises at least one component selected from the group of components: isolator, WDM coupler, optical amplification medium, and filter.

14. An optical amplifier of claim 10, wherein said temperature adjustment member is a heating body capable of being mounted on said optical component body.

15. An optical amplifier of claim 14, wherein said heating body is a plate-shaped body including a Peltier element of heat pipe.

16. An optical amplifier of claim 10, wherein said temperature adjustment member includes heat insulating material for thermally insulating said temperature adjustment member from surroundings of said temperature adjustment member.

17. An optical amplifier of claim 10, wherein the optical characteristic of the prescribed type is at least one characteristic selected from the group of characteristics: amplification characteristic, noise factor characteristic, wavelength-dependent output power difference, and filtering characteristic.

18. An optical amplifier of claim 13, wherein said optical amplification medium is an optical fiber doped with a rare earth element.

19. An optical amplifier of claim 10, wherein said optical system comprises a plurality of optical component bodies, said optical amplifier comprising a plurality of said temperature adjustment member for each of said optical component bodies, respectively.

20. An optical amplifier of claim 10, wherein said optical system comprises a plurality of optical component bodies, and said temperature adjustment member is operable for adjusting the temperature of all of said optical component bodies.

21. A method of controlling a quality of an optical characteristic of an optical amplifier comprising a temperature adjustment member, and an optical system comprising an optical component having an optical component body, wherein the optical component performs optical processing on an optical signal, the optical component has the quality of the optical characteristic with respect to the optical processing, and the quality of the optical characteristic is dependent on temperature, said method comprising:

acquiring information that represents the quality of the optical characteristic of the optical component at a current time point, wherein the acquired information is the optical power of the optical signal at a position prior to passage through the optical component;

generating a temperature control signal based on the acquired information;

adjusting the temperature of the temperature adjustment member to a holding temperature in response to the temperature control signal; and adjusting the optical characteristic to an optical characteristic of quality corresponding to an adjustment temperature by directly or indirectly setting the temperature of the optical component body to the adjustment temperature via the holding temperature of the temperature adjustment member.

22. A method according to claim 21, wherein said acquiring of information that represents the quality of the optical characteristic of the optical component further comprises detecting the temperature of the optical component.

23. A method according to claim 21, further comprising:

previously measuring a temperature dependence of the quality of the optical characteristic of the optical component; and reading a temperature corresponding to a desired quality from results of the previously measured temperature dependence of the quality of the optical characteristic of the optical component;

wherein said generating of the temperature control signal comprises generating the temperature control signal as a signal to make the temperature of the optical component substantially equal to the adjustment temperature.

24. A method according to claim 21, further comprising:

previously setting, as a reference value, a value of information of a same type as the acquired information relating to the temperature that confers the desired quality of the optical characteristic of the optical component;

wherein said generating of the temperature control signal comprises generating the temperature control signal for achieving the adjustment temperature by comparing the value of the acquired information and the reference value.

25. A method according to claim 24, wherein said generating of the temperature control signal comprises:

lowering the temperature of the adjustment member if a result of the comparison of the reference value and the value of the acquired information indicates that the value of the acquired information is larger than the reference value; and raising the temperature of the adjustment member if the result of the comparison of the reference value and the value of the acquired information indicates that the value of the acquired information is smaller than the reference value.

26. A method according to claim 21, wherein the optical component comprises at least one component selected from the group of components: isolator, WDM coupler, optical amplification medium, and filter.

27. A method according to claim 21, wherein the temperature adjustment member is a heating body capable of being mounted on the optical component body.

28. A method according to claim 27, wherein the heating body is a plate-shaped body including a Peltier element of heat pipe.

29. A method according to claim 21, wherein the temperature adjustment member includes heat insulating material for thermally insulating the temperature adjustment member from surroundings of the temperature adjustment member.

30. A method according to claim 21, wherein the optical characteristic of the prescribed type is at least one characteristic selected from the group of characteristics: amplification characteristic, noise factor characteristic, wavelength-dependent output power difference, and filtering characteristic.

31. A method according to claim 26, wherein the optical amplification medium is an optical fiber doped with a rare earth element.

32. A method according to claim 21, wherein the optical system comprises a plurality of optical component bodies, the optical amplifier comprising a plurality of the temperature adjustment members for each of the optical component bodies, respectively.

33. A method according to claim 21, wherein the optical system comprises a plurality of optical component bodies, and the temperature adjustment member is operable for adjusting the temperature of all of the optical component bodies.

* * * * *